United States Patent [19]
Doerksen et al.

[11] 3,905,269
[45] Sept. 16, 1975

[54] ELECTRONIC RHYTHM-TEACHING MACHINE

[76] Inventors: David P. Doerksen, 15550 S.W. Burntwood Ct., Beaverton, Oreg. 97005; Paul I. Bennett, Rt. 2, Box 180B, McMinnville, Oreg. 97128

[22] Filed: July 12, 1973

[21] Appl. No.: 378,655

[52] U.S. Cl. .................. 84/470; 84/479; 84/484
[51] Int. Cl.² ........................................ G09B 15/08
[58] Field of Search ............ 84/470, 471, 477, 478, 84/484

[56] References Cited
UNITED STATES PATENTS

| | | | |
|---|---|---|---|
| 2,193,335 | 3/1940 | Lamp | 84/470 |
| 2,814,230 | 11/1957 | Johnston | 84/478 |
| 3,026,634 | 3/1962 | Irazoqui | 84/470 X |
| 3,406,604 | 10/1968 | Stickley et al. | 84/484 |
| 3,456,546 | 7/1969 | Welsh et al. | 84/478 |
| 3,552,256 | 1/1971 | Soanes et al. | 84/470 X |
| 3,595,122 | 7/1971 | Brediceanu | 84/484 |
| 3,719,118 | 3/1973 | Colburn | 84/478 |
| 3,774,494 | 11/1973 | Reid et al. | 84/470 |
| 3,808,936 | 5/1974 | Shrader | 84/471 |
| 3,823,637 | 7/1974 | Scott | 84/470 |

Primary Examiner—Lawrence R. Franklin
Attorney, Agent, or Firm—Kolisch, Hartwell, Dickinson & Stuart

[57] ABSTRACT

Apparatus for teaching a selected musical characteristic, such as rhythm, wherein a program-indicating mask is used in conjunction with an arrangement of light sources whose lighted conditions are utilized, during performing of the indicated program by a student, to report the accuracy of such performance with respect to the selected characteristic. Also employed is an electronic judging circuit which is programmed in accordance with the program indicated by the mask, and is responsive to a student's performance to control the lighted conditions of the light sources.

16 Claims, 14 Drawing Figures

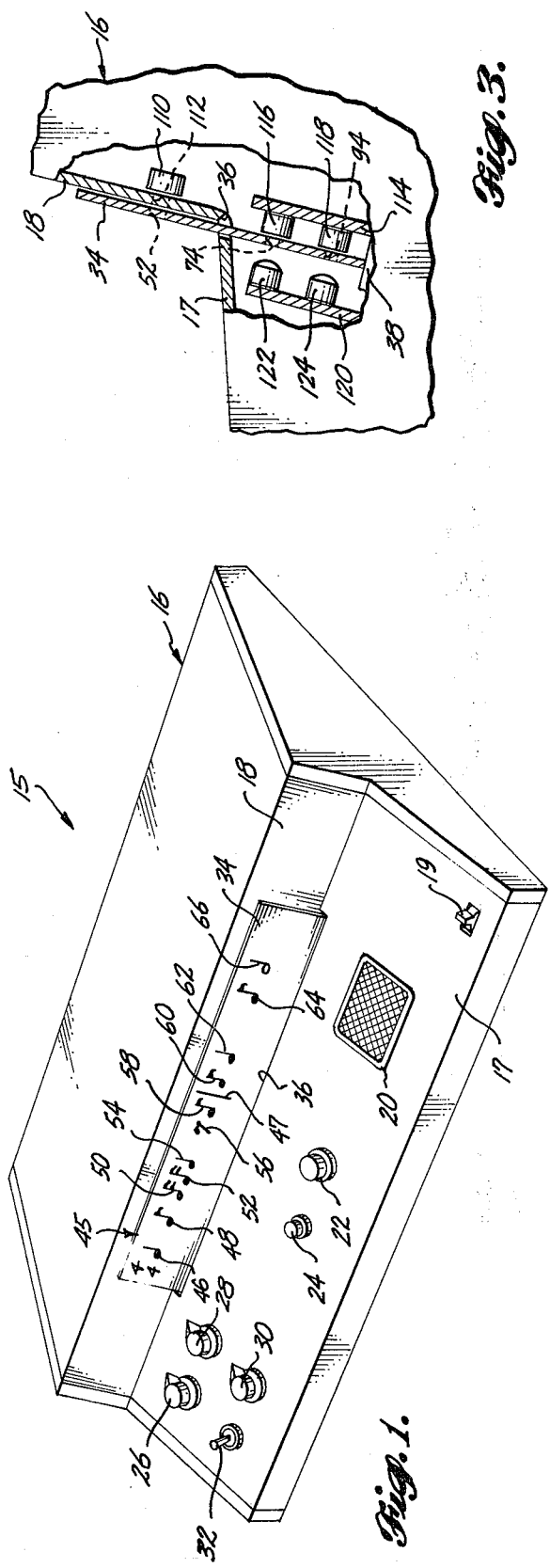

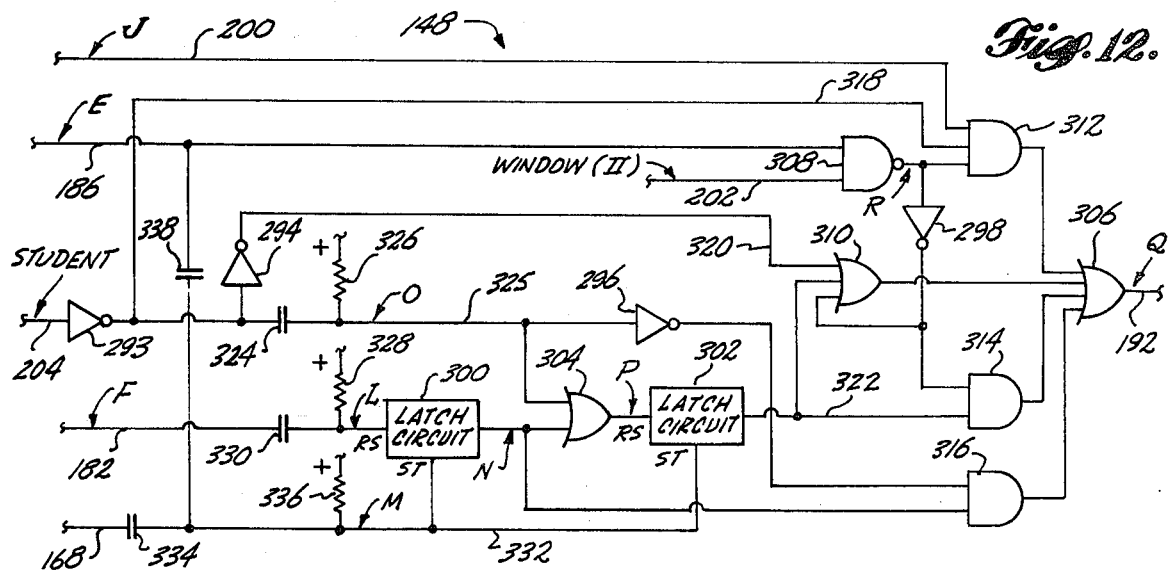

3,905,269

ELECTRONIC RHYTHM-TEACHING MACHINE

BACKGROUND AND SUMMARY OF THE INVENTION

This invention pertains to teaching apparatus, and more particularly to such apparatus which is employable to instruct in the correct performing of a selected musical characteristic, such as rhythm. A preferred embodiment of the invention is described herein in conjunction with the teaching of musical rhythm, in which context the invention has been found to have particular utility.

The ability to execute rhythm accurately and independently is an essential skill in musical performance. However, of all basic musical characteristics, rhythm has been among the most difficult for which to provide satisfactory individual instruction. Because in most communities there are generally few instructors for the typically large numbers of students seeking training, the opportunity for an individual session with an instructor is simply not available to many. In most cases, therefore, music students receive rhythm instruction as members of a group, wherein it is exceedingly difficult to judge the individual performances of the different students. For example, in a group situation, an instructor cannot discover and deal with all inaccuracies as they occur; nor can he give immediate reinforcement to current performance.

A general object of the present invention, therefore, is to provide novel apparatus which may be used objectively, and very effectively, to instruct individually in the correct performing of a selected musical characteristic, such as rhythm.

Another object of the invention is to provide such apparatus which offers a wide degree of instructing flexibility. To this end, the proposed apparatus features a construction which can accommodate an infinite number of different musical passages, or exercises, for practice by a student, and which further enables a student to vary the degree of difficulty of accurately performing such exercises.

Still another object of the invention is to provide apparatus of the type outlined which is relatively simple to use, and which when used provides an immediate and clear visual report with respect to the accuracy of a student's performance.

These and other objects and advantages attained by the invention will become more fully apparent in the description of a preferred embodiment of the invention which follows below.

DESCRIPTION OF THE DRAWINGS

FIG. 1 is a simplified front and top perspective view of a musical rhythm-teaching device constructed in accordance with the present invention, with an exercise or program card as contemplated herein shown mounted in operative position in the device.

FIG. 2 shows details of the program card of FIG. 1, with the card removed from the device of FIG. 1.

FIG. 3 is an enlarged fragmentary side elevation, partly in cross section, further illustrating the mounting of the mentioned program card in the device of FIG. 1.

FIG. 12 is a detailed circuit diagram of a turn-off decision circuit employed in the circuit of FIG. 4.

FIG. 13 is similar to FIGS. 9 and 11, except that it illustrates voltage waveforms that occur at different points in the circuit of FIG. 12.

Figure 4:
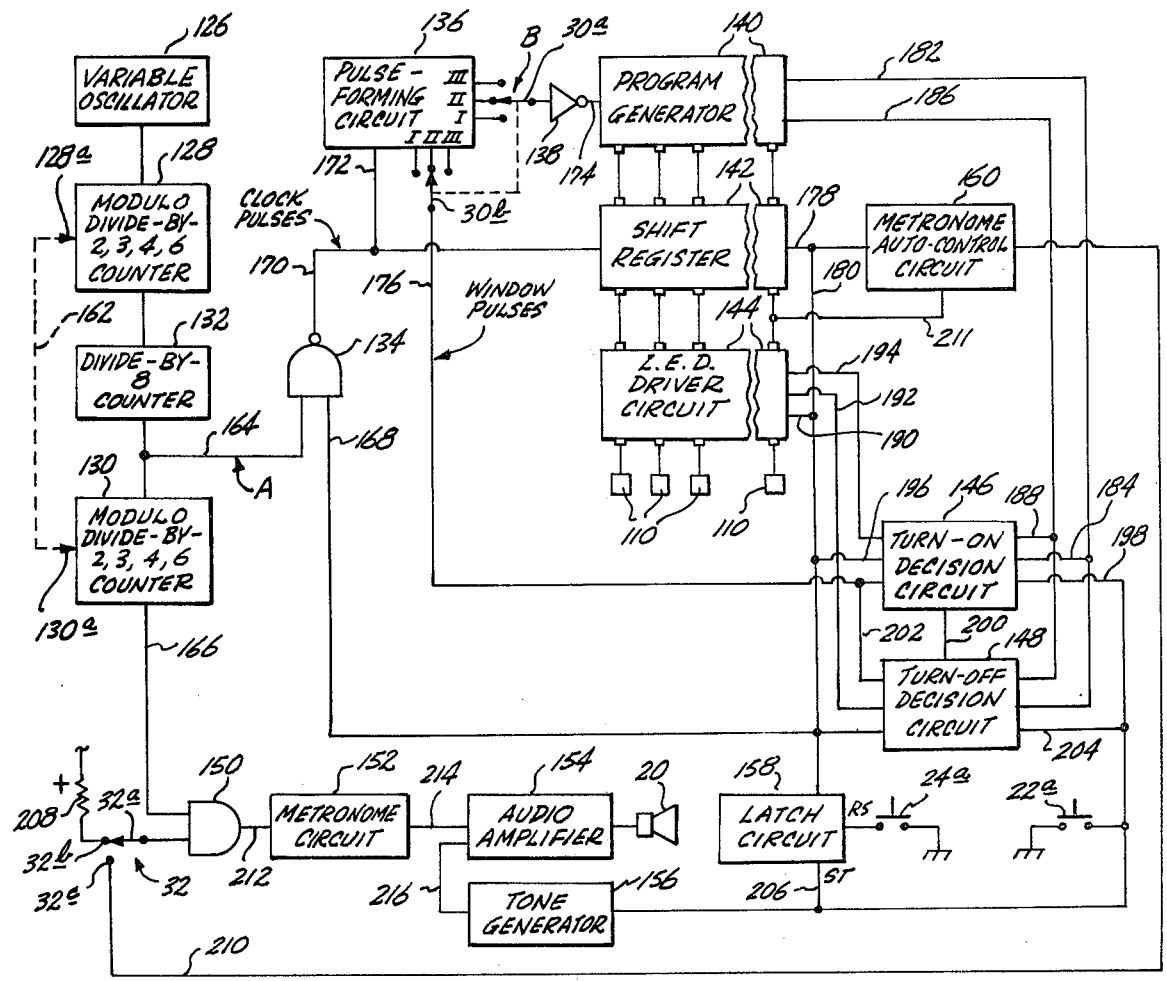
FIG. 4 is a block diagram generally illustrating electronic circuitry employed in the device of FIG. 1.
Figure 14:
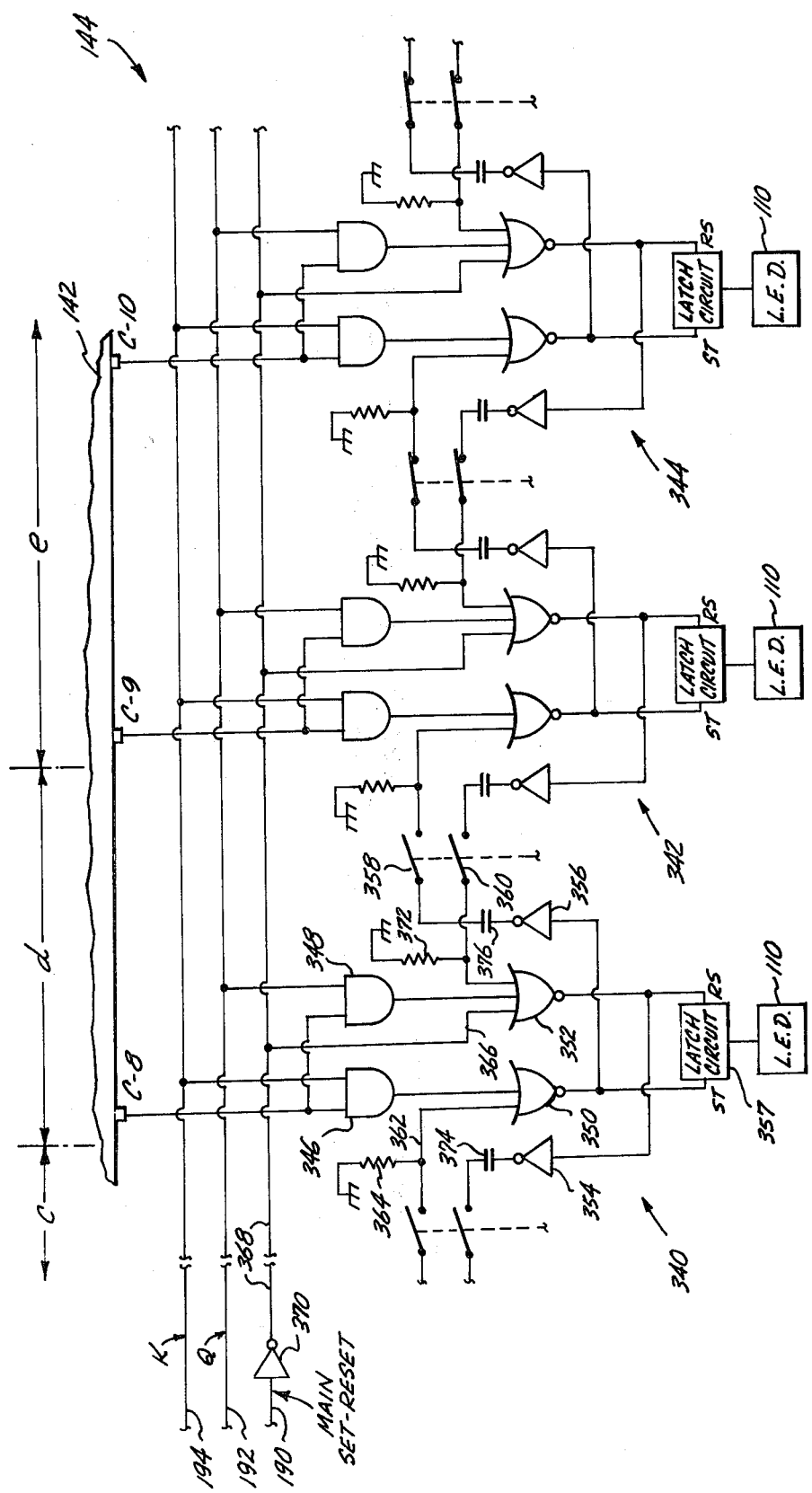

And, FIG. 14 is a fragmentary detail of portions of the circuitry employed in an L.E.D. driver circuit used in the circuit of FIG. 4.

DETAILED DESCRIPTION OF THE INVENTION

1. Explanation of Terminology

Explaining briefly certain terminology which will be used in the description which follows, various components shown in the drawings operate in response to a pair of voltage levels. More specifically, one of these levels corresponds to a certain positive voltage (typically about +5 volts) which will be referred to hereinafter as a 1 state. The other level corresponds essentially to ground, and will be called hereinafter a 0 state. A terminal or a conductor having one of these voltage levels on it, will be referred to as being in, or as having on it, either a 1 or a 0 state.

2. Description of Logic Gates Used

Among the components illustrated in the drawings which respond to the two voltage levels just mentioned are certain logic gates. More specifically, four different types of gates, all conventional in construction, are employed. These are referred to as AND, NAND, OR and NOR gates.

An AND gate functions as follows: with a 0 state on any input of the gate, the output thereof is held in a 0 state; with all inputs in 1 states, the output is placed also in a 1 state.

In a NAND gate: with a 0 state on any input, the output is held in a 1 state; with all inputs in 1 states, the output is placed in a 0 state.

In an OR gate: if any input is in a 1 state, the output of the gate is held also in a 1 state; if all inputs are in 0 states, then the output is also in a 0 state.

Finally, a NOR gate functions whereby: if any input is in a 1 state, the output is held in a 0 state; if all inputs are placed in 0 states, then the output is placed in a 1 state.

3. The Teaching Device Generally

Turning now to the drawings, and referring first particularly to FIG. 1, indicated generally at 15 is a musical rhythm-teaching device, or apparatus, constructed in accordance with the present invention. As will become more fully apparent, while device 15 has been built to instruct in the accurate performing of musical rhythms, modifications are easily made to enable the device to teach other musical characteristics—for example, musical pitch.

Device 15 herein includes a low-format housing 16 which contains other components in the device, and which includes an inclined front deck 17 joining with an inclined front panel 18. Suitably mounted on deck 17 are a main on-off switch 19, a loud-speaker 20, a performance input key 22 and a reset key 24. Keys 22, 24 are conventional in construction, including herein normally open switches 22a, 24a, respectively (see FIG. 4), which are actuated by the usual spring-biased buttons exposed above deck 17. Key 22 is also referred to herein as a receiving means, as a signal-generating means, and as a performance responder.

Also suitably mounted on deck 17 are several other controls in the device, including an infinitely variable tempo adjuster 26, a four-position beat-division switch 28, a three-position degree-of-difficulty switch, or adjustable means, 30, and a metronome control switch 32.

In general terms, when device 15 is to be used, the student makes initial adjustments in controls 26, 28, 30, 32. The tempo adjuster 26 is manipulated to choose the desired beat-rate, or tempo, at which the student wishes to perform a selected exercise. This controls the rate of audible "beats" generated initially in loud-speaker 20 by a metronome circuit which is contained in the device. It also sets the tempo at which other internal circuitry will judge the student's performance of the exercise.

Metronome control switch 32 has two positions which may be chosen. In one of these the metronome circuit (just mentioned) continues to generate audible beats throughout the student's performance. In the other position, such beats are heard up until the time that the student begins performing the exercise. The beats then "disappear" until the student completes the exercise, at which time they return.

Beat-division switch 28, which has four positions (divisions of 2, 3, 4, or 6), is set to the appropriate position in accordance with the "time signature" and rhythmic range of the selected exercise. Basically, the way of determining which position to use, is to see what is the shortest rhythmic value contained in an exercise, and to note its proportion to the note receiving one beat. For example, in 4/4 time if a sixteenth note is the shortest, since this is one fourth of a quarter note, switch 28 would typically be set to the "division of 4" setting. If an eighth note is the shortest, since this is one half of a quarter note, the "division of 2" position would be used. If an eighth note is the shortest, but is included in a triplet, where three such notes together span the same time as a quarter note, division of 3 or of 6 positions may be used. As will become apparent, such selections of positions for switch 28 are of primary interest in efficiently utilizing available programming space in device 15 and in program cards used therewith.

Switch 30 is adjusted to the desired one of three different degrees of performance difficulty offered in device 15. In these three different conditions, the device judges a student's performance with different time-tolerances. Such tolerances will be discussed in detail later.

With controls 26, 28, 30, 32 thus adjusted, and device 15 in a ready or stand-by condition, the student may begin his performance at any time by operating key 22. This he then continues for each note contained in the selected exercise. Key 24 is for resetting the device to a standby condition at the completion of the exercise, or at any earlier time, if desired.

4. The Program Card and Associated Apparatus

According to the present invention, teaching device 15 is readied for operation by means of a program card, or exercise card, such as the one shown at 34. Card 34 is also referred to herein both as a mask, and as a display means.

Accommodating removable mounting of card 34 on device 15 is an elongated slot 36 (formed in deck 17 where it joins with panel 18) and an elongated footing 38 (see FIG. 3) extending along and beneath slot 36 inside of housing 16. In FIGS. 1 and 3, card 34 is shown mounted on the teaching device in what is referred to as a masking position, with the card extending through slot 36, and resting on footing 38 and against the front face of panel 18.

While different materials may be used, card 34 is preferably formed from a suitable light-colored, light-opaque, relatively stiff sheet plastic material which is trimmed to the appropriate size. Typical dimensions of this card might be about 2 inches×12 inches×1/32 inch.

Program information is stored in three rows on card 34, along spaced-apart lines 40, 42, 44 (see FIG. 2) which substantially parallel the card's longitudinal axis. More particularly, such information is stored selectively at 32 different program positions along these three lines, at the points of intersection (or crossing points) therebetween and 32 right-angularly disposed, equally spaced lines designated C-1 to C-32, inclusive. In general terms, what is stored along line 40 are representations of the individual elements (i.e., notes and rests) of a musical rhythmic passage, or exercise, which is to be performed. Such a passage is indicated generally at 45. Stored along lines 42, 44 are indicia utilized to inform certain circuitry employed in device 15 with respect to the time-beginnings and time-endings, respectively, of the different elements in the passage on line 40.

The particular passage displayed on line 40 is divided by a bar 47 into two measures, the first measure including (in sequence) a quarter note 46, an eighth note 48, two sixteenth notes 50, 52, another quarter note 54, an eighth rest 56, and another eighth note 58. The other measure includes an eighth note 60, a quarter note 62, another eighth note 64 and a half note 66.

The representation of each note appears as a generally circular bead disposed on line 40, with a stem (in some instances bearing one or more flags) rising from the bead. According to the invention, the bead portion of a note comprises a light-transmissive region in card 34. In the cases of all notes except note 66, the light-transmissive regions occupy the full areas of the beads. In the case of note 66 (the half note in the passage), the light-transmissive region takes the form of a circumferential ring defining the bead in the note. The stems and flags in the notes herein are not light-transmissive, but rather are markings suitably printed on the front face of card 34.

Rest 56 comprises a light-transmissive region in its entirety.

Were a whole note included in the passage, it would appear about the same as note 66, except that it would not include an upright stem.

The particular way in which the light-transmissive regions just mentioned are produced in the card is a matter of choice. For example, these regions may be produced simply by punching apertures in the card at the appropriate locations. They may also simply be prepared as optical voids in the coloring material used in the card. In the latter case, such voids may either be colorless, or may be provided with some selected light-transmissive coloring agent. In any event, regardless of how the light-transmissive regions are prepared, it is important that a student viewing the front of the card (as in FIGS. 1 and 2), be able easily to read the rhythmic passage which is to be executed. The card constructions just suggested will assure this.

Suitably printed on the front face of the card, adjacent the left end of the row of notes, is a time signature indicating how the measures in the passage are to be divided into musical beats. In card 34, the time signature 4/4 is employed to indicate that there are four beats to each measure, and that a quarter note is to be given the value of one beat. Thus, and considering the different elements of the passage, note 46 is to receive one beat, note 48 a half beat, notes 50, 52 a quarter beat each, note 54 one beat, rest 56 and notes 58, 60 one half beat each, note 62 one beat, note 64 one half beat, and note 66 two beats.

As an explanatory aid herein, each of the elements of passage 45 is assigned, so-to-speak, a different longitudinal span of card 34, with the respective spans for the different elements being in proportion, lengthwise, to the relative beat-values of the respective elements. The shortest elements in the passage, sixteenth notes 50, 52, are each assigned to a longitudinal span which encompasses but one set of crossing points on lines 40, 42, 44. The next shortest elements, eighth notes 48, 58, 60, 64 and rest 56, which have beat values twice those of the sixteenth notes, are each assigned a span which encompasses two sets of such crossing points. Quarter notes 46, 54, 62, which have beat values twice those of the rest and the eighth notes, are each assigned spans encompassing four sets of crossing points. And, half note 66 is assigned a span encompassing eight sets of crossing points.

Tracing across card 34 from left to right in FIG. 2: note 46 is associated with span $a$ which encompasses the crossing points with lines C-1 through C-4; note 48 with span $b$ which encompasses the crossing points with lines C-5, C-6; notes 50, 52 with spans $c$, $d$, respectively, which encompass the crossing points with lines C-7, C-8, respectively; note 54 with span $e$ which encompasses the crossing points with lines C-9 through C-12; rest 56 with span $f$ which encompasses the crossing points with lines C-13, C-14; notes 58, 60 with spans $g$, $h$, respectively, which encompass the crossing points with lines C-15, C-16 and C-17, C-18, respectively; note 62 with span $i$ which encompasses the crossing points with lines C-19 through C-22; note 64 with span $j$ which encompasses the crossing points with lines C-23, C-24; and note 66 with span $k$ which encompasses the crossing points with lines C-25 through C-32. In this arrangement, it will be noted that the number of sets of crossing points associated with a particular note is proportional to the beat value of the note in the exercise.

Further describing card 34, note 46 is positioned at program position C-1, note 48 at position C-5, notes 50, 52 at positions C-7, C-8, respectively, note 54 at position C-9, rest 56 at position C-13, note 58 at position C-15, note 60 at position C-17, note 62 at position C-19, note 64 at position C-23, and note 66 at position C-25. It is thus apparent that, as one progresses across card 34 from left to right in FIG. 2, the representations of the various elements of passage 45 are positioned at the first-encountered program position in the respective spans. Such an arrangement is desirable in that it yields a particularly well-distributed, easily read display of the passage. As will become more fully apparent, however, except with respect to notes 50, 52, each other element in the passage may be located at any other program position in its respective span if such is desired.

Hereinafter, the term first-encountered with respect to a span will retain the meaning just explained. The term last-encountered will refer to the opposite end of the span.

As was mentioned earlier, the indicia distributed along lines 42, 44 are for indicating the time-beginnings and time-endings, respectively, of the different elements in passage 45. These indicia take the form of light-transmissive zones formed similarly to the light-transmissive regions mentioned above.

Each note in passage 45 (which reflects something that a student must both physically begin and end) is associated with a pair of zones—one of these being disposed on line 42, and the other being disposed on line 44. The zone disposed on line 42 is positioned in the span associated with the note, at the first-encountered program position in this span. The zone disposed on line 44 is also located within the span for the associated note, but is positioned at the last-encountered program position therein. Thus, and tracing along line 42 from left to right in FIG. 2, associated with notes 46, 48, 50, 52, 54, 58, 60, 62, 64, 66, are zones 68, 70, 72, 74, 76, 78, 80, 82, 84, 86, respectively, which are positioned at program positions C-1, C-5, C-7, C-8, C-9, C-15, C-17, C-19, C-23, C-25, respectively. Progressing similarly along line 44 for the same respective notes, one encounters zones 88, 90, 92, 94, 96, 98, 100, 102, 104, 106, respectively. These zones are located at program positions C-4, C-6, C-7, C-8, C-12, C-16, C-18, C-22, C-24, C-32, respectively. Considering for a moment notes 50, 52, it will be observed that since each of these notes is associated with but a single program position, the two zones for each note are located at the same program position containing the note.

A somewhat different situation exists with respect to rest 56, which reflects, not some positive action which a student must begin and end, but rather a time-span of inaction on his part. According to the invention, a student is not judged as to the beginning of a rest. He is judged only as to whether he allows the full rest period to pass, without his playing a note. Thus, card 34 contains no indication as to when a rest period should begin, and, there is no zone along line 42 associated with rest 56. However, it is important to indicate when the rest should end. Thus, there is provided along line 44 a zone 108 which is within span $f$, and is located at program position C-14.

It should be noted at this point that the same arrangement and relative positioning of program positions and crossing points just described is employed according to the invention in other cards containing other program information.

Considering FIG. 3 along with FIGS. 1 and 2, illustrated in FIG. 3 are certain electrical optical components which are employed in device 15, and are mounted within housing 16. More particularly, suitably mounted on the inside of panel 18, in a row substantially paralleling the longitudinal axis of this panel, are 32 light-emitting diodes, or light sources, such as diode 110. These diodes are disposed above slot 36, and are equally spaced apart—the spacing between adjacent diodes being the same as the spacing between the program position C lines shown in FIG. 2. Each diode 110 is aligned with an aperture, such as aperture 112 in panel 18 through which the diode shines when energized.

Mounted beneath slot 36 on a mounting board 114 are two more rows of light-emitting diodes, the upper one of these two rows containing 32 diodes, such as diode 116, and the lower row containing 32 diodes, such as diode 118. These two rows substantially parallel the row containing diodes 110. The spacing between adjacent diodes 116, and between adjacent diodes 118 is the same as that between adjacent diodes 110. Diodes 110, 116, 118 are arranged with each diode 110 occupying a common vertical plane with a diode 116 and a diode 118—this plane being parallel to the plane of FIG. 3.

Also mounted beneath slot 36, on a mounting board 120 are two rows of phototransisters including an upper row containing 32 phototransisters, such as phototransister 122, and a lower row containing 32 phototransisters, such as phototransister 124. Each phototransister 122 is slightly spaced from and directly confronts a diode 116. Similarly, each phototransister 124 is slightly spaced from and directly confronts a diode 118. Diodes 116, 118 and phototransisters 122, 124 are referred to herein collectively as electro-optical circuit means, and also as responsive means.

Further considering the components just discussed, these are so arranged that they align with crossing points in card 34 when the card is placed in the device in a masking position (as illustrated in FIGS. 1 and 3). Thus, with the card so placed, there is a light-emitting diode exposed in every light-transmissive region along line 40 in the card. Similarly, with respect to each light-transmissive zone along lines 42, 44 in the card, there is an associated light-emitting diode and phototransister pair which view each other through this zone. In FIG. 3, a cross section is shown as if taken along line C-8 in card 34. At this point it can be seen that the light-emitting diode 110 which is shown in the figure is exposed in the bead of note 52, and that the diodes 116, 118 which are shown communicate through zones 74, 94, respectively, with the phototransisters 122, 124, respectively, which are shown.

It will be evident that while a particular program card has been illustrated and described herein in detail, an infinite number of other similar cards, containing different programs, may be prepared for use in accordance with the construction principles just outlined. Thus, a musical rhythmic exercise may be displayed along line 40 in a card, with this exercise including notes located at the appropriate ones of the 32 different crossing points or program positions available along line 40. Appropriate light-transmissive zones associated with this program are of course prepared at the appropriate ones of the 32 crossing points along lines 42, 44.

With a program card so made, i.e., with the different pieces of information on it located at the mentioned crossing points, when the card is placed in a masking position in device 15, appropriate ones of the light-emitting diodes and phototransisters will confront the light-transmissive portions of the card.

As will further become evident in the descriptive material which follows, the invention is not limited to accommodating rows containing 32 crossing points in a card. In other words, the device's capacity can be contracted or expanded as desired to accommodate as many crossing points or program positions as are wanted.

5. The Circuitry Generally

The circuitry utilized in device 15 is illustrated in schematic and block form in FIG. 4. Included in this circuitry are means which function, essentially, as sources of certain elemental voltage pulses which are fed to other portions of the circuitry. This means includes a variable-pulse-rate oscillator 126, a pair of adjustable so-called modulo divide-by-2, 3, 4, or 6 counters 128, 130, a divide-by-8 counter 132, a two input NAND gate 134 and a pulse-forming circuit 136. Also included in the circuitry illustrated in FIG. 4 are an inverter 138, a program generator 140, a shift register 142, a light-emitting diode driver circuit 144 (designated L.E.D. driver circuit) a turn-on decision circuit 146 and a turn-off decision circuit 148. Further included are a two input NAND gate 150, a metronome circuit 152, an audio amplifier 154, a tone generator 156, a latch circuit 158 and a metronome auto-control circuit 160.

Oscillator 126 is conventional, and when operating supplies to counter 128 positive voltage square-wave pulses with a 50 percent duty cycle. The pulse rate, or frequency, of this oscillator is infinitely adjustable, through a manipulation of tempo adjuster 26 (a potentiometer), between 64 Hertz and 320 Hertz.

Counters 128, 130, which are also conventional units, are essentially identical in construction. Each of these counters includes a means (represented by arrowheads 128a, 130a) through the operation of which the divisor employed by the counter (i.e., 2, 3, 4 or 6) may be selected. When the divisor 2 is selected in one of these counters, the counter provides at its output terminal one output voltage pulse for each two input voltage pulses received. Similarly, when the divisor 3 is selected, the counter provides an output pulse for every three input pulses, and so on. The divisor-selecting means in counters 128, 130 are ganged together herein in such a manner that when the divisors 2, 3, 4 or 6 are selected, respectively, in counter 128, simultaneously the divisors 6, 4, 3, and 2, respectively, are selected in counter 130. This ganging arrangement is indicated by dashed line 162 in FIG. 4. The two divisor-selecting means in the counters are actuated by beat-division switch 28. In particular, with switch 28 in its divisions by 2, 3, 4, 6 positions, respectively, counter 128 is set to divide by 2, 3, 4, 6, respectively, and counter 130 is set to divide by 6, 4, 3, 2, respectively.

Counter 132 is also conventional in construction, and as can be seen, is interposed between counters 128, 130. For every eight voltage pulses supplied counter 132 from counter 128, the former supplies one pulse to counter 130, and through a conductor 164 to the left input of gate 134 in FIG. 4. Counter 130 supplies pulses via conductor 166 to the upper input of gate 150 in FIG. 4.

The right input of gate 134 is connected to a conductor 168. The output of this gate is connected through a conductor 170 to the input of shift register 142, and through conductor 170 and a conductor 172 to the input of pulse-forming circuit 136.

Circuit 136 is also conventional in construction, and performs in a manner which will be described later. The pulse-forming circuit is provided with two sets of output terminals, with each set containing three terminals, and with these sets being shown on the right and bottom sides of the block in FIG. 4 representing the circuit. As can be seen in this block, in each set of terminals, the individual terminals are numbered I, II and III. These two sets of output terminals are connected respectively to two sets (with three in each) of contacts in previously mentioned degree-of-difficulty switch 30. This switch includes two ganged-together wipers 30a, 30b which are adjusted simultaneously to engage different ones of the contacts in switch 30. The way things are connected herein, in the three different positions which wipers 30a, 30b can occupy, the wipers always engage contacts connected to correspondingly numbered output terminals in circuit 136. In FIG. 4, the wipers are shown engaging those contacts connected to the output terminals designated II. Wiper 30a is connected to the input of inverter 138 whose output is connected through conductor 174 to program generator 140. Wiper 30b is connected to a conductor 176.

Shift register 142 herein is a conventional integrated circuit device, in this case including 32 pairs of output terminals, only four pairs of which are shown in FIG. 4. Corresponding output terminals in the shift register, which terminals are directly electrically connected to one another, are disposed in vertical alignment in FIG. 4. The upper output terminals in the shift register are connected to 32 different input terminals in program generator 140. The lower output terminals in the shift register are connected to 32 different input terminals in L.E.D. driver circuit 144. The reset terminal of the shift register is connected to a conductor 178 which is connected through a conductor 180 to previously mentioned conductor 168.

Each pair of corresponding output terminals in the shift register is associated with a different one of the 32 program positions mentioned earlier in connection with card 34. Such is true also with respect to the input terminals in the program generator and in the L.E.D. driver circuit. Such associations are indicated in several of the detail figures herein, where program position identifications are placed next to the associated terminals.

With a 0 state applied to the reset terminal of the shift register, the same remains in a reset condition, with 0 states on each of its output terminals. With a 1 state applied to conductor 170, and a 1 state existing on conductor 178, the shift register responds to successive state changes of 1 to 0 thereon to place temporary 1 states on successive pairs of output terminals. Such operation is well understood by those skilled in the art.

Considering other connections illustrated in FIG. 4 for program generator 140, this unit is connected through a conductor 182 to circuit 148, and through conductor 182 and a conductor 184 to circuit 146. Further, the program generator is connected through a conductor 186 to circuit 148, and through this conductor and a conductor 188 to circuit 146. The function performed by the program generator will be described later.

Driver circuit 144 includes 32 output terminals, each of which herein is connected to a different one of previously mentioned light-emitting diodes 110, and each one of which is associated with a different one of the 32 above-mentioned program positions. Also, circuit 144 is connected through a conductor 190 to conductor 180, through a conductor 192 to circuit 148, and through a conductor 194 to circuit 146.

Considering additional connections shown for circuits 146, 148 in FIG. 4, circuit 146 is connected to conductor 180 through a conductor 196 and is also connected to previously mentioned conductor 176. A conductor 198 connects circuit 146 with tone generator 156. Circuit 148 is connected to circuit 146 through a conductor 200, to previously mentioned conductor 176 through a conductor 202, to previously mentioned conductor 168, and to previously mentioned conductor 198 through a conductor 204.

Conductor 198 is connected to one side of switch 22a, the other side of which is grounded. Further, conductor 198 is connected to the set terminal (marked ST) in latch circuit 158 through a conductor 206. The output terminal in this latch circuit is connected to conductor 180, and the reset terminal (marked RS) is connected to one side of switch 24a, the other side of which is grounded.

Metronome control switch 32, shown in FIG. 4, includes a wiper 32a and a pair of contacts 32b, 32c. Wiper 32a, which is shown engaging contact 32b, is connected to the lower input of gate 150. Contact 32b is connected through a resistor 208 to a suitable source of positive voltage which also supplies other components herein. Contact 32c is connected through a conductor 210 to metronome auto-control circuit 160. Circuit 160 is also connected to previously mentioned conductor 178, and through a conductor 211 to the thirty-second (right hand most) lower output terminal in shift register 142.

Completing a description of what is shown in FIG. 4, the output of AND gate 150 is connected through a conductor 212 to metronome circuit 152, the latter being connected to an input terminal in amplifier 154 through a conductor 214. The output of tone generator 156 is connected to another input terminal in amplifier 154 through a conductor 216. The output of amplifier 154 is connected to speaker 20.

6. The Generation of Certain Control Pulses

Let us now examine briefly the cooperative operations of oscillator 126, counters 128, 130, 132, gate 134, and pulse-forming circuit 136. For the sake of convenience, let us assume that oscillator 126 has been adjusted to operate at the frequency of 96 Hertz. Let us also assume that counters 128, 130 have been adjusted to operate with divisors of 4 and 3, respectively, and that switch 30 has been adjusted to place wipers 30a, 30b in the positions shown therefor in FIG. 4. Under such circumstances, the oscillator supplies pulses to counter 128, the negative edges of which pulses produce counting in this counter, with counter 128 supplying a pulse to counter 132 for every four pulses received by it from the oscillator. Similarly, counter 132 counts on each negative edge of a pulse supplied from counter 128, and supplies a pulse to counter 130 and to conductor 164 for each eight pulses received by it from counter 128. With oscillator 126 operating at 96 Hertz, and with the divisors employed by counters 128, 132 being 4 and 8, respectively, the pulses supplied to counter 130 and to conductor 164 will have a frequency of 3 Hertz and a 50 percent duty cycle. These pulses, which alternate in amplitude between 0 and 1, are designated A herein, and are illustrated in the graph marked A in FIG. 7.

For every three A pulses received by counter 130, this counter supplies a pulse over conductor 166 to the upper input of gate 150. The frequency of these pulses is 1 Hertz.

If conductor 168 is in a 0 state, pulses A on conductor 164 have no further effect. However, when conductor 168 is in a 1 state, pulses A pass through gate 134, in inverted form, and are applied to conductors 170, 172—these pulses being referred to herein as CLOCK pulses. Such pulses are illustrated in the graph marked CLOCK in FIG. 7. It will be noted that as with the A pulses, the CLOCK pulses alternate between 0 and 1, and have a 50 percent duty cycle. During each CLOCK pulse, the period of time that the pulse remains in a 1 state (with oscillator 126 operating at the frequency mentioned) is about 167 milliseconds. These CLOCK pulses are applied both to circuit 136 and to shift register 142. What occurs in the shift register with these pulses will be explained later. What occurs in circuit 136 with receipt of these pulses is illustrated in the remaining six graphs of FIG. 7.

More specifically, it will be noted that these six graphs are arranged in three groups of two (bracketed), with each such group containing an upper graph marked WINDOW followed by a parenthesized Roman numeral, and a lower graph marked B also followed by a parenthesized Roman numeral which is the same numeral used with respect to the upper graph. The upper graph in each group illustrates pulses which are produced at the correspondingly numbered lower output terminal in circuit 136. The lower graph in each group illustrates the pulses produced at the correspondingly numbered right output terminal in circuit 136. Thus, progressing downwardly in FIG. 7: the first group of two graphs illustrates the pulses present at those output terminals of circuit 136 marked I; the next group indicates those pulses present at the output terminals marked II; and the lowest group indicates the pulses present at the output terminal marked III. The amplitude of each of these waveforms alternates between 0 and 1.

With respect to the different WINDOW pulses provided by circuit 136, the positive portions of the WINDOW(I) pulses have widths one half those of the positive portions of the CLOCK pulses, the positive portions of the WINDOW(II) pulses have the same widths as such portions of the CLOCK pulses, and the positive portions of the WINDOW(III) pulses have widths one and one half times those of the positive portions of the CLOCK pulses. In each case, it will be noted that the different WINDOW pulses are time-centered on the trailing or negative edges of the CLOCK pulses. Under the conditions being described herein, the WINDOW(I) pulses each have a width of about 83 milliseconds, the WINDOW(II) pulses each have a width of about 167 milliseconds, and the WINDOW(III) pulses each have a width of about 250 milliseconds.

The various B pulses have exactly half the widths of the corresponding WINDOW pulses, and are aligned in time exactly with the trailing half portions of the corresponding WINDOW pulses. Thus, the B(I) pulses have a width of about 42 milliseconds, the B(II) pulses a width of about 83 milliseconds, and the B(III) pulses a width of about 125 milliseconds.

Figure 7:
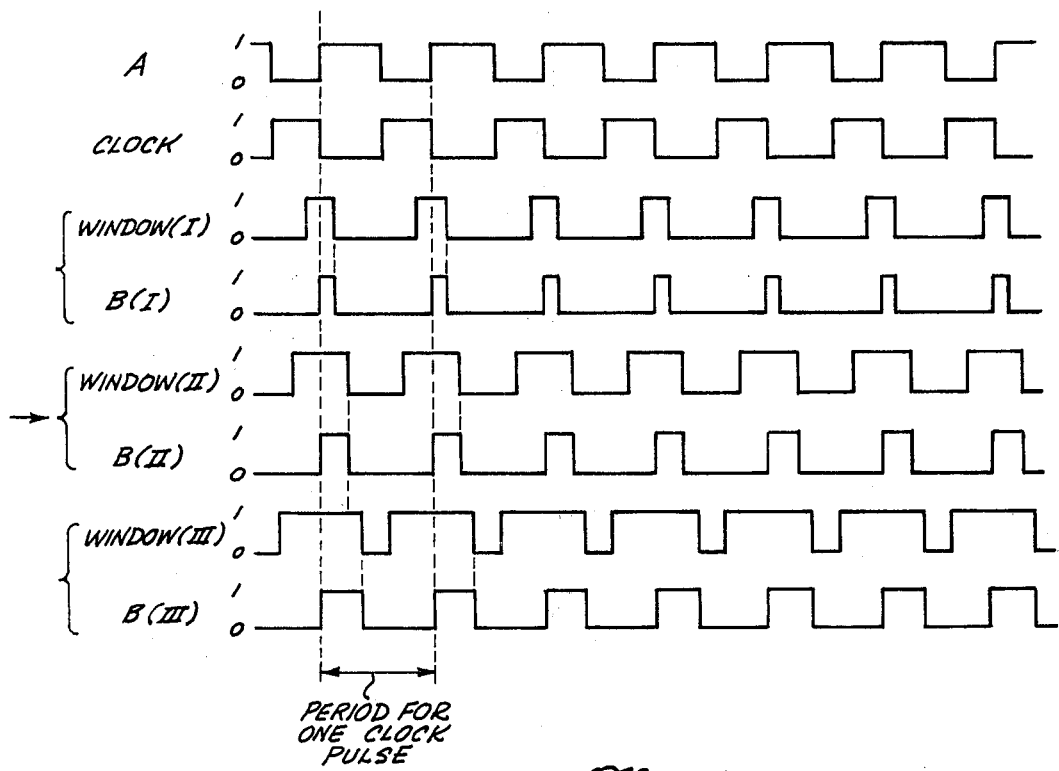
FIG. 7 is a graph showing, on a common time base, several different voltage waveforms which are producible at different points in the circuit of FIG. 4.

The various time-alignments between the CLOCK, WINDOW and B pulses are clearly illustrated in FIG. 7.

It should be understood that there are a number of different specific ways in which the WINDOW and B pulses just described may be generated from the CLOCK pulses. These different ways all involve conventional circuit construction, the details of which are not important to the present invention. Thus, rather than elaborating on a particular circuit for providing these pulses, circuit 136 is represented herein simply as a single block. It should further be understood that as the frequency of oscillator 126 is changed, with such resulting in corresponding frequency changes in the CLOCK pulses, the widths and alignments of the WINDOW and B pulses adjust accordingly.

The three different groups of WINDOW and B pulses are employed herein, as will be more fully explained, to afford three different degrees of difficulty by which a student's performance of a musical passage may be judged. The highest degree of difficulty is obtained from the pulses provided at output terminals I in circuit 136. The next highest degree of difficulty is obtained from the pulses provided at output terminals II. And, the lowest degree of difficulty is obtained from those pulses provided at output terminals III.

With wipers 30a, 30b engaging output terminals II, device 15 is illustrated in a condition to perform with the intermediate degree of difficulty just mentioned. Thus, supplied to the input of inverter 138 are the B(II) pulses, and supplied to conductors 176, 202 are the WINDOW(II) pulses. It should be recalled that these pulses are supplied only under circumstances of CLOCK pulses existing on conductor 170, which can only occur with oscillator 126 operating, and a 1 state present on conductor 168. As an aid in recalling hereinafter which specific WINDOW and B pulses are employed with device 15 in the condition illustrated, an arrow is utilized in FIG. 7 to designate the WINDOW(II) and B(II) pulses.

7. The Metronome Auto-Control Circuit

Figure 5:
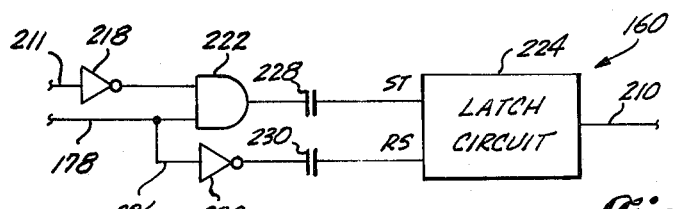
FIG. 5 illustrates details of a metronome auto-control circuit used in the circuit of FIG. 4.

Considering now the construction of metronome auto-control circuit 160, this is illustrated in FIG. 5. It includes a pair of inverters 218, 220, an AND gate 222 and a latch circuit 224. The input of gate 218 is connected to conductor 211, and the output of this inverter is connected to the upper input of gate 222 in FIG. 5. Conductor 178 connects with the lower input of gate 222, and through a conductor 226 to the input of inverter 220. The output of gate 222 is connected through a capacitor 228 to the set terminal of latch circuit 224. Similarly, a capacitor 230 connects the output of inverter 220 to the reset terminal of this latch circuit. The output terminal of the latch circuit is connected to previously mentioned conductor 210.

Figure 6:
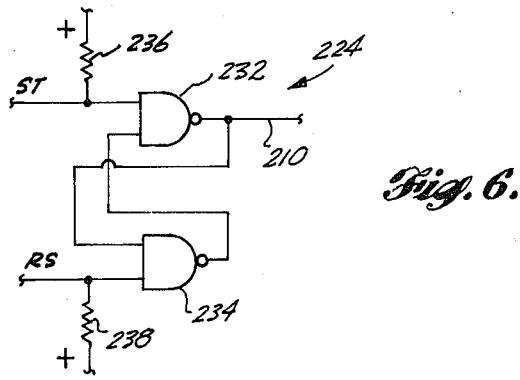
FIG. 6 illustrates details of a latch circuit as employed herein.

Diverting attention for a moment to FIG. 6, this illustrates details of latch circuit 224. This latch circuit, which is substantially identical to the other latch circuits disclosed herein, and which is conventional in construction, includes a pair of NAND gates 232, 234. The upper input of gate 232 comprises the set terminal of the circuit, and is normally biased to a 1 state through a resistor 236. The lower input of this gate is connected directly to the output of gate 234, and the output of gate 232 is connected both to conductor 210 and to the upper input of gate 234. The lower input of gate 234 comprises the reset terminal in the latch circuit, and like the set terminal, is normally biased to a 1 state through a resistor 238.

Explaining briefly how latch circuit 224 performs, the circuit is said to be in a reset condition with a 0 state existing on the output of gate 232. Under such circumstances, the output of gate 234 is held in a 1 state. With this the situation, voltage state changes on the reset terminal have no effect in the circuit. However, a voltage change from 1 to 0 on the set terminal causes the output of gate 232 to switch to a 1 state, whereupon the output of gate 234 is switched to a 0 state which, being applied to the lower input of gate 232, then holds the output of gate 232 in a 1 state. Under these circumstances, the circuit is said to be in a set condition, wherein further voltage state changes on the set terminal have no effect in the circuit. The latch circuit may be reset by causing the voltage state on the reset terminal to change from 1 to 0.

This operation which has just been described for latch circuit 224 is the same for all latch circuits shown herein.

Returning now to FIG. 5, and explaining the operation of circuit 160, let us assume initially that 0 states exist on conductors 178, 211, and that a 1 state exists on conductor 210. Under such circumstances, latch circuit 224 is in a set condition. A 1 state exists on the upper input of gate 222, a 0 state exists on the output of this gate, and a 1 state exists on the output of inverter 220. A state change on conductor 211 at this time is of no effect. However, a state change of 0 to 1 on conductor 178 causes a state change of 1 to 0 on the output of inverter 220, and a state change of 0 to 1 on the output of gate 222. The latter-mentioned state change is of no effect at this time, but the change on the output of gate 220 causes a momentary negative pulse to be applied to the reset terminal of circuit 224. As a consequence, the latch circuit becomes reset, and applies a 0 state to conductor 210.

With a 1 state remaining on conductor 178, should the state on conductor 211 change from 0 to 1, even momentarily, a negative pulse is applied to the set terminal of latch circuit 224, setting the circuit, and thus returning a 1 state to conductor 210.

The manner in which this operation of circuit 160 is utilized herein will be discussed later.

8. The Program Generator

Figure 8:
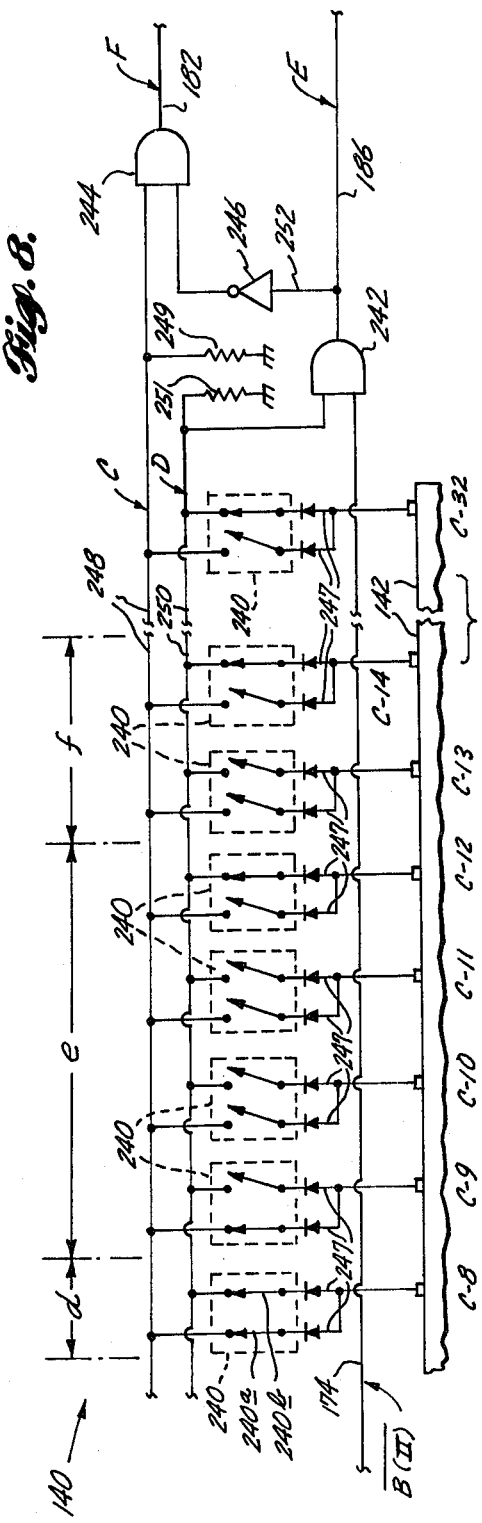
FIG. 8 is a fragmentary detail view of a portion of a program generator used in the circuit of FIG. 4.

Details of program generator 140 are partially illustrated in FIG. 8. The program generator includes a plurality of double-pole switching units, such as units 240, a pair of AND gates 242, 244, and an inverter 246. Thirty-two switching units 240 are included.

For the sake of convenient illustration herein, each switching unit 240 is shown as a mechanical-type unit including a pair of mechanical switches, such as left and right switches 240a, 240b, respectively, in FIG. 8. While mechanical switches are thus shown and described, it should be understood that such switches, if desired, could be electronic in nature.

The two switches in a switching unit 240 are normally-open type switches, with switch 240a in the unit being operatively associated with a phototransistor 122, and switch 240b in the unit being operatively associated with the phototransistor 124 which directly underlies the just-mentioned phototransistor 122. When these two phototransistors are nonilluminated by the associated light-emitting diodes 116, 118, switches 240a, 240b remain open. However, when either of these phototransistors is illuminated by the associated light-emitting diode, the associated switch is closed.

Still referring to what is illustrated in FIG. 8, it will be noted that the lower sides of each set of switches 240a, 240b in the figure are directly interconnected through pairs of diodes, such as diodes 247, to the different upper output terminals in shift register 142. The upper end of each switch 240a is connected to a conductor 248 which connects with the upper input of gate 244 in FIG. 8. Similarly, the upper end of each switch 240b is connected to a conductor 250 which is connected to the upper input of gate 242 in FIG. 8. Conductors 248, 250 are connected to ground through resistors 249, 251, respectively. Previously mentioned conductor 174 connects with the lower input of gate 242, the output of which gate connects with previously mentioned conductor 186. A conductor 252 interconnects conductor 186 and the input of inverter 246, the output of this inverter being connected directly to the lower input of gate 244. The output of gate 244 is connected to previously mentioned conductor 182.

Explaining the conditions of the switches of the several switching units 240 shown in FIG. 8, these are the conditions which result therein with device 15 in an operative condition, and with card 34 placed in the device as shown in FIGS. 1 and 3. The 32 different switching units 240 are provided herein to accommodate the 32 different program positions, previously discussed, used in a program such as card 34. Each one of units 240 is associated with a different one of these 32 positions, and is intended to be internally configurable (i.e., respecting the open or closed conditions of its switches) to reflect the particular program called for at the associated position by a particular card which is being used in device 15. More specifically, the switch 240a in a unit 240 is intended to indicate whether or not a note is indicated on the card as beginning at the associated position. Switch 240b in the unit is intended to indicate whether a note or a rest should terminate at such position. With the particular musical passage which is illustrated herein, each switching unit 240 is associated with a musical character (note or rest) having the rhythmic value of one sixteenth. A pair of two adjacent switching units are associated with a musical character having the rhythmic value of one-eighth, and so on.

Specifically illustrated in FIG. 8 are those switching units 240 associated with spans d, e, and f of the program on card 34. Also illustrated (to the right of all of these other switching units) is that switching unit in the program generator which is associated with the thirty-second or last program position on card 34.

It will be recalled that span d in the program includes sixteenth note 52 below which in the card are apertures 74, 94. Accordingly, the two particular phototransistors illustrated in FIG. 3 which are associated with span d are illuminated, and the two associated switches in the associated switching unit 240 are shown closed in FIG. 8. Span e in the program contains quarter note 54, and is thus assigned four switching units 240 in the program generator. As indicated by apertures 76, 96 in the card, note 54 is to begin at program position C-9, and to end at program position C-12. Thus, in the switching unit associated with position C-9, switch 240a is closed and switch 240b open. In those units associated with positions C-10, C-11, all switches are open. And, in that unit associated with position C-12, switch 240a is open and switch 240b closed. Span f contains one eighth rest 56. This span is associated with program positions C-13, C-14. According to the present invention, no specific indication is given as to the beginning of a rest, but such an indication is given with respect to the end of the rest. Thus, both switches in the unit 240 associated with position C-13 are open. In the unit associated with position C-14, switch 240a is open and 240b closed. Finally, in the switching unit associated with program position C-32, where note 66 is intended to end, switch 240a is open and switch 240b closed.

By comparing the positions of the various switches shown in FIG. 8 with the locations of apertures in card 34 as shown in FIG. 2, it will become readily apparant how, with a program card inserted in device 15, switching units 240 in the program generator become configured in accordance with the program indicated on the card.

Figure 9:
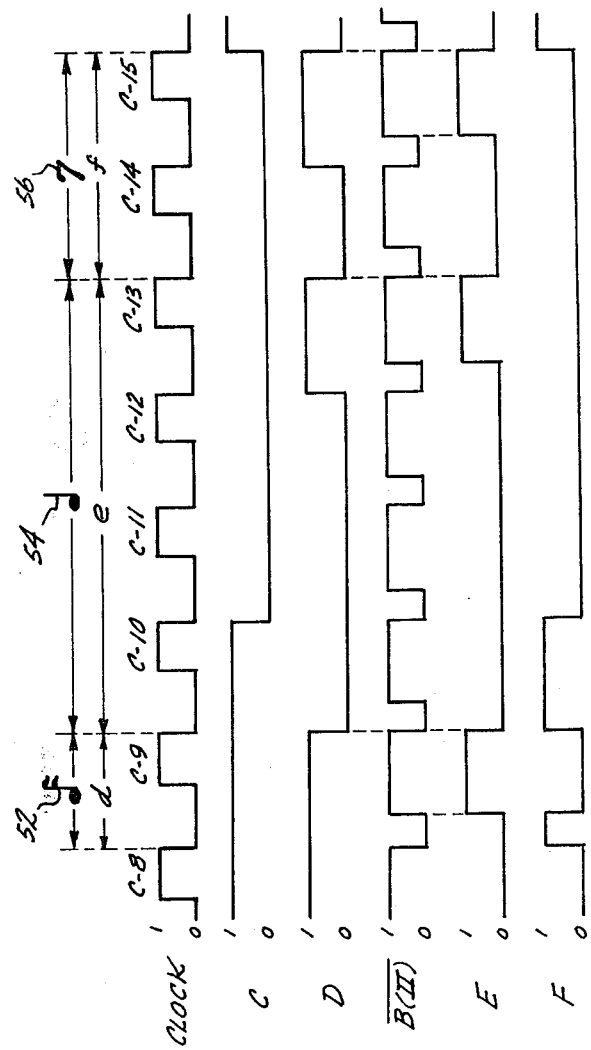
FIG. 9 is a graph illustrating, on a common time base, several different voltage waveforms which appear at different points in the circuit of FIG. 8.

FIG. 9 illustrates graphically, and on a common time scale, voltage conditions which exist at various points in FIG. 8 during operation of device 15. In particular what is shown in FIG. 9 are voltage conditions occurring during spans d, e and f of the program indicated on card 34. While a more complete explanation of the voltage conditions will be presented later, it might be noted at this point that voltage C occurs on conductor 248, voltage D on conductor 250, voltage $\overline{B(II)}$ (which is the inverse of B(II)) occurs on conductor 174, voltage E on conductor 186, and voltage F on conductor 182. As will become more fully apparent, voltage F is employed herein particularly to indicate the correct time beginnings of the various notes displayed on a program card, and voltage E is to indicate time endings of such notes, and of any rests.

9. The Turn-On Decision Circuit

Figure 10:
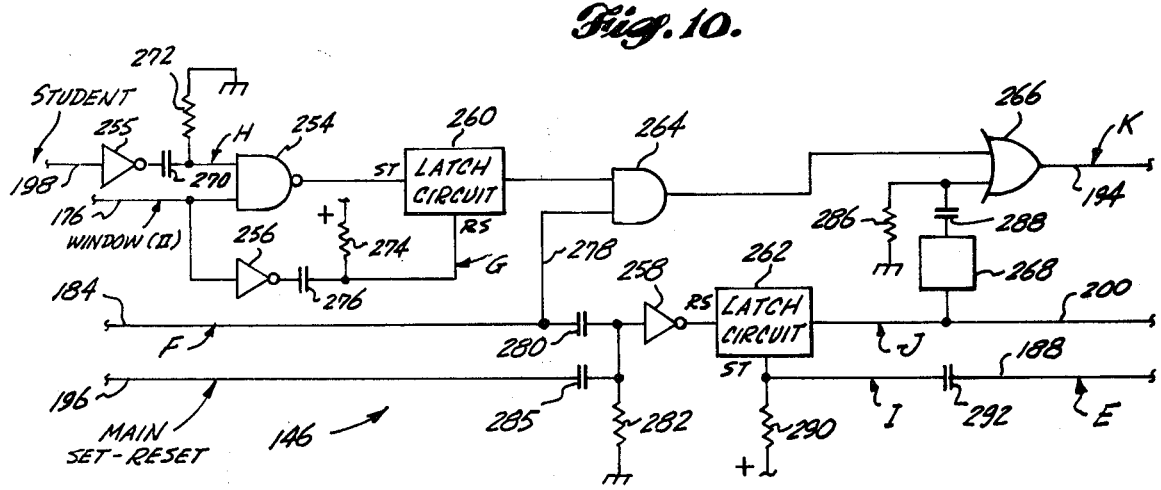
FIG. 10 is a detailed circuit diagram of a turn-on decision circuit which is included in the circuit of FIG. 4.

The details of turn-on decision 146 are illustrated in FIG. 10. Included in this circuit are a NAND gate 254, three inverters 255, 256, 258, a pair of latch circuits 260, 262, an AND gate 264, an OR gate 266, and a low-pass frequency filter represented by block 268.

The upper input of gate 254 in FIG. 10 is connected through a capacitor 270 to the output of inverter 255, whose input is connected to conductor 198. The upper input of gate 254 is also connected through a resistor 272 to ground. The lower input of this gate is connected directly to conductor 176 as well as to the input of inverter 256. The output of gate 254 is connected directly to the set terminal of latch circuit 260, the reset input of this circuit being normally biased to a 1 state through a resistor 274, and being connected through a capacitor 276 to the output of inverter 256.

Previously mentioned conductor 184 is connected through a conductor 278 to the lower input of gate 264, the upper input of which is connected directly to the output of latch circuit 260. Also, conductor 184 is connected through a capacitor 280 to the input of inverter 258. This input is normally biased to a 0 state through grounded resistor 282, and further is connected to previously mentioned conductor 196 through a capacitor 285.

The output of gate 264 is connected directly to the upper input of gate 266 in FIG. 10. The lower input of this gate is normally biased to a 0 state through a grounded resistor 286, and is connected to the output of filter 268 through a capacitor 288. The output of gate 266 is connected to previously mentioned conductor 194.

Completing a description of what is shown in FIG. 10, the output of inverter 258 is connected to the reset terminal of latch circuit 262, with the set terminal of this circuit biased to a 1 state through a resistor 290 and connected through a capacitor 292 to conductor 188. The output terminal of circuit 262 is connected to conductor 200, which also is connected to the input of filter 268.

Figure 11:
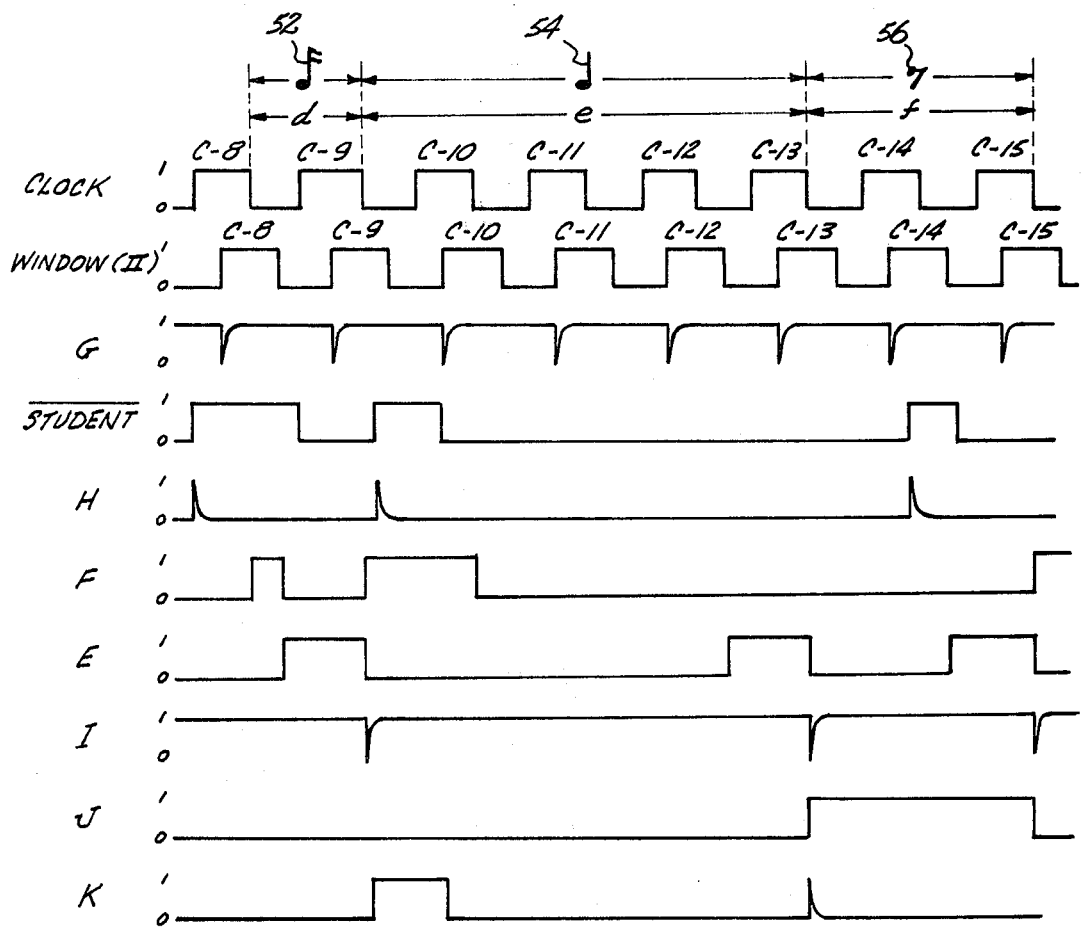
FIG. 11 is similar to FIG. 9, except that it illustrates voltage waveforms which occur at different points in the circuit of FIG. 10.

FIG. 11 is similar in character to FIG. 9, except that it illustrates certain voltage conditions which exist at different places in FIG. 10. Like FIG. 9, FIG. 11 focuses on those voltage conditions which occur during operation of device 15 in program spans d, e and f. Further, included in FIG. 11 is a representation of voltage conditions, or more specifically the inverse thereof, produced on conductor 198 by an assumed performance of a student (shown as $\overline{STUDENT}$). Considering the specific locations of the voltage conditions shown in FIG. 11, voltage WINDOW(II) appears on conductor 176, voltage G on the reset terminal of latch circuit 260, voltage $\overline{STUDENT}$ on the output of inverter 255, voltage H on the upper input of gate 254, voltages F, E on conductors 184, 188, respectively, voltage I on the set terminal of latch circuit 262, and voltages J, K on conductors 200, 194, respectively. The manners in which these different voltages arise will be explained more fully later.

10 The Turn-Off Decision Circuit

Turn-off decision circuit 148 is illustrated in FIG. 12. It includes four inverters 293, 294, 296, 298, a pair of latch circuits 300, 302, a pair of OR gates 304, 306, a NAND gate 308, a NOR gate 310 and three AND gates 312, 314, 316.

Tracing through the various connections shown in FIG. 12, gate 312 includes three inputs, the upper one of which is connected directly to conductor 200, the intermediate one of which is connected through a conductor 318 to the output of inverter 293 (whose input is connected to conductor 204), and the lower one of which is connected directly both to the output of gate 308 and to the input of inverter 298. The upper input of gate 308 is connected directly to conductor 186, and the lower input of this gate is connected to conductor 202. The lower one of the three inputs in gate 310 is connected to the output of inverter 298. The upper input of gate 310 is connected through a conductor 320 to the output of inverter 294, the input of this inverter being connected to the output of inverter 293. The middle input of gate 310 is connected to a conductor 322 which interconnects the output terminal of latch circuit 302 and the lower input of gate 314. The upper input of gate 314 is also connected to the output of inverter 298.

Further describing what is shown, the output of inverter 293 is connected through a capacitor 324 and a conductor 325 to the input of inverter 296 and to the upper input of gate 304 in FIG. 12. A resistor 326 biases these two inputs normally to 1 states. The reset terminal of latch circuit 300 is normally biased to a 1 state through a resistor 328, and is coupled to conductor 182 through a capacitor 330. The set terminal of this latch circuit is connected to a conductor 332 which is connected through a capacitor 334 to conductor 168, and which is also connected directly to the set terminal of latch circuit 302. A resistor 336 biases this conductor normally to a 1 state. The output terminal of circuit 300 is connected directly to the lower input of gate 304, and also directly to the lower input of gate 316. The output of gate 304 is connected directly to the reset terminal of latch circuit 302.

Completing a description of what is shown in FIG. 12, a capacitor 338 interconnects conductors 186, 332. The output of inverter 296 is connected to the upper input of gate 316. The outputs of gate 310, 312, 314, 316 are each connected directly to a different one of the four inputs of gate 306. And, the output of gate 306 is connected to conductor 192.

FIG. 13 is similar to FIGS. 9 and 11, except that it illustrates voltage conditions existing at various points in the circuitry shown in FIG. 12.

Referring briefly to the voltage wave forms shown in FIG. 13, voltage F appears on conductor 182, voltage L on the reset terminal of latch circuit 300, voltages WINDOW(II) and E on conductors 202, 186, respectively, and voltage R on the output of gate 308. Further, voltage M appears on conductor 332, voltage N on the output terminal of latch circuit 300, voltage $\overline{STUDENT}$ on conductor 204, voltage O on conductor 325, voltage P on the reset terminal of latch circuit 302, and voltages J, Q on conductors 200, 192, respectively.

11. The L.E.D. Driver Circuit

Circuit 144 comprises a plurality, namely 32, of subcircuits, such as the three subcircuits indicated generally at 340, 342, 344 in FIG. 14. Each of these subcircuits is associated with a different one of the 32 lower output terminals in shift register 142, and thus is associated with a different one of the 32 available program positions. Subcircuits 340, 342, 344 herein are associated with those lower output terminals in the shift register which are associated with program positions C-8, C-9, C-10, respectively.

The various subcircuits in circuit 144 are substantially identical in construction, and thus only subcircuit 340 will be described in detail. This subcircuit includes a pair of AND gates 346, 348, a pair of NOR gates 350, 352, a pair of inverters 354, 356, and a latch circuit 357. Also included in each of the subcircuits, except for that subcircuit which is associated with program position C-32, is a pair of ganged-together switches, such as switches 358, 360. These switches are represented and treated herein as being mechanical-type switches, although it should be understood that they may if desired be electronic in nature. These two switches in a subcircuit are ganged, or otherwise operatively connected, to the switch 240b which is associated with the same program position. The operative connection just mentioned is such that with the associated switch 240b open, switches 358, 360 are both closed, and vice versa.

Further describing subcircuit 340, the left input of gate 346 in FIG. 14 is connected directly both to the lower output terminal in the shift register which is associated with program position C-8, and also to the left input of gate 348. The right input of gate 346 is connected to previously mentioned conductor 194. The right input of gate 348 is connected to previously mentioned conductor 192. The output of gate 346 is connected to one of the two inputs of gate 350, and the output of gate 348 is connected to one of the three inputs of gate 352.

The left input of gate 350 in FIG. 14 is connected through a conductor 362 to the right side of that switch immediately to the left of subcircuit 340 which corresponds to previously mentioned switch 358. This conductor is normally biased to a 0 state through grounded resistor 364. The output of gate 350 is connected directly both to the set terminal of latch circuit 357, and to the input of inverter 356.

The left input of gate 352 is connected through a conductor 366 to a conductor 368, the latter-mentioned conductor being connected to the output of an inverter 370 whose input is connected to previously mentioned conductor 190. The right input of gate 352 in FIG. 14 is connected to the left side of switch 360 in the figure, and is normally biased to a 0 state through grounded resistor 372. The output of gate 352 is connected directly both to the reset terminal of latch circuit 357 and to the input of inverter 354. The output terminal of latch circuit 357 is suitably connected to that light-emitting diode 110 which appears in FIG. 3.

Completing a description of subcircuit 340, the output of inverter 354 is connected through a capacitor 374 to the right side of that switch which is immediately to the left of subcircuit 340 and which corresponds to switch 360. The output of inverter 356 is connected through a capacitor 376 to the right side of switch 358.

On comparing subcircuits 342 and 344 with subcircuit 340, the likenesses in construction will become readily apparent.

The conditions of switches 358, 360, and of those other switches shown in FIG. 14 which correspond to these two switches, are related, as just described, to the conditions of the associated switches 240b, some of which are illustrated in FIG. 8. For example, switches 358, 360 are open because of the closed condition of the switch 240b which is associated with program position C-8 in FIG. 8.

12. Operation

Considering now how device 15 as a whole operates, let us assume that card 34 is seated in the device as shown in FIGS. 1 and 3, and that oscillator 126 is operating at the specific frequency (96 Hertz) discussed earlier. Let us assume further that beat-division switch 28 is set to its divisions-of-4 position, that degree-of-difficulty switch 30 is set with wipers 30a, 30b positioned as shown in FIG. 4, and that metronome control switch 32 is set with wiper 32a engaging contact 32b (also as shown in FIG. 4). Under such circumstances, A pulses, as shown in FIG. 7, having a frequency of 3 Hertz exist on conductor 164, and pulses having a frequency of 1 Hertz exist on conductor 166. With switch 32 set as just described, metronome auto-control circuit 160 plays no role in the operation of the device. Further, gate 150 is in a condition to supply pulses to metronome circuit 152, these pulses emanating from the 1 Hertz pulses existing on conductor 166. The metronome circuit, which is conventional in construction, produces audio clicks that are amplified in audio amplifier 154 and supplied to speaker 20. These clicks furnish the student with an audible metronomic beat, establishing a tempo for performing the exercise on card 34. In device 15, these clicks are initiated in synchronization with the positive edge of an A pulse.

Another initial condition existing in device 15 is that a 0 state exists on conductors 168, 178, 180, 190, 196.

Such a condition exists by virtue of the fact that at the conclusion of whatever was the last exercise performed on the device, the then student operated reset key switch 24a. With a 0 state on conductor 168, gate 134 is, so-to-speak, closed, with the result that there are no CLOCK pulses, B pulses or WINDOW pulses.

Program generator 140, shift register 142, and L.E.D. driver circuit 144 are all initially dormant, with the output terminals of the shift register all in 0 states, and with light-emitting diodes 110 all turned off. Also dormant at this point in time are decision circuits 146, 148.

Finally, and further explaining initial conditions in device 15, light-emitting diodes 116, 118 are on. As a consequence, and with card 34 in the masking position shown in FIGS. 1 and 3, the appropriate ones of phototransistors 122, 124 are illuminated properly to program the device for judging a student's performance of the exercise on card 34. Thus, the appropriate switches in switching units 240 are closed, and the appropriate associated switches in the L.E.D. driver circuit are opened. As will become apparent the closing of switches in units 240 determines the way in which program generator 140 operates, and the opening of switches in the L.E.D. driver circuit determines the way in which light-emitting diodes 110 will be turned on and off.

When a student is ready to begin the exercise, he simply closes key switch 22a, thus beginning the first note in the exercise, and simultaneously energizing tone generator 156. Typically, he will do this after listening to the metronomic beat for long enough to have a good feeling for the rhythm at which he has elected to perform the exercise. And, he will normally try initially to close switch 22a in substantial simultaneity with the occurrence of a beat. This beginning of the very first note in the exercise is not judged as to correctness—it being a feature of the invention that the student always is in control of when to begin, and is always considered to have begun correctly. However, the ending of this first note, as well as the beginnings and endings of all other notes, are judged.

It is intended that the student keep switch 22a closed for what he believes should be the full duration of each note performed. Device 15 is constructed to require that, at the minimum, switch 22a should be closed no less than about one-quarter of the full time which could be allotted to a note—before the next note must begin. At the maximum, a note may last until shortly before the beginning of the next note. This will be more fully explained later. Thus, for the first note in the exercise on card 34, the student should attempt to hold switch 22a closed for at least one-quarter of a full beat (one full CLOCK pulse period)—the first note in the exercise being a quarter note, and a quarter note being assigned the value of a full beat (recall the 4/4 time signature).

With initial closing of switch 22a, a 0 state is placed on conductors 198, 204, 206. Such, of course, occurs with each successive closure of switch 22a. At the beginning of an exercise, placing of a 0 state on conductor 206 sets latch circuit 158, thereby causing a 1 state to be placed on conductors 168, 178, 180, 190, 196. This situation then remains until closure of switch 24a.

With setting of latch circuit 158, gate 134 is opened, whereupon A pulses are inverted by the gate to create CLOCK pulses on conductors 170, 172. This situation then results in B(II) pulses and WINDOW(II) pulses being applied to the input of inverter 138 and to conductor 176, respectively. As was previously mentioned, FIG. 7 illustrates these several pulses, and their time relationships to one another.

The CLOCK pulses on conductor 170, and particularly the negative edges of these pulses, cause shifting in the shift register—the negative edge of the first-produced CLOCK pulse causing the first pair of output terminals in the shift register to switch to a 1 state, the next-produced CLOCK pulse causing the second pair of output terminals to switch to a 1 state and the first pair to return to a 0 state, and so on. The CLOCK pulses existing on conductor 172 cause pulse-forming circuit 136 to generate the B(II) and WINDOW(II) pulses, as previously described. The B(II) pulses are inverted by inverter 138, and are supplied via conductor 174 to the program generator. The WINDOW(II) pulses are supplied via conductors 176, 202 to decision circuits 146, 148.

For the purpose of explaining the operations of the program generator, the turn-on decision circuit, and the turn-off decision circuit, FIGS. 9, 11 and 13, respectively, have been included in the drawings to indicate how these circuits operate, particularly during previously-mentioned program spans $d$, $e$, $f$. It is believed that an explanation of what occurs during these three selected program spans fully explains the internal operations of these three circuits. The internal operation of L.E.D. driver circuit 144 is explained particularly with reference to program span $d$, and portions of program spans $c$, $e$.

Turning first to the program generator, in general terms, this circuit has two principal functions: first, to supply conductor 182 with voltage pulses reflective of minimum acceptable performance times for notes in the program on the card in the device; and second, to supply conductor 186 with voltage pulses indicative generally that the different notes and rests in an exercise should end by particular times. Pulses supplied the program generator from inverter 138, together with pulses supplied from the different upper output terminals in the shift register, are combined in accordance with the positions of switches in units 240 to produce these conditions on conductors 182, 186.

Reference should be had at this point to FIGS. 8 and 9, along with FIG. 2. In FIG. 9, the inverted B(II) pulses (designated $\overline{B(II)}$) which are supplied from inverter 138 are shown. Also shown, at the top of this figure, are CLOCK pulses, as well as program notes 52, 54, and rest 56, which occupy program spans $d$, $e$, $f$, respectively. These latter materials have been included in the figure to provide a time reference for the other electrical events depicted in the figure. Also, appearing over each of the CLOCK pulses in FIG. 9 are C numbers which relate these pulses to the similarly marked output terminals in the shift register on which the pulses cause 1 states to appear.

On the occurrence of the trailing edge of the eighth CLOCK pulse, designated C-8, which marks the beginning of program span $d$, output terminals C-8 in the shift register switch to a 1 state. Because of the closed positions of both switches in the switching unit 240 associated with program span $d$, this 1 state is applied to conductors 248, 250, causing voltages C, D to remain in 1 states. Voltages C, D were already in 1 states at the beginning of program span $d$, because of the presence of sixteenth note 50 in just-completed program span c. Voltages C, D remain in 1 states throughout span d. With the arrival of the trailing edge of CLOCK pulse C-9, at the end of span d, shift register output terminals C-8 return to a 0 state, and output terminals C-9 are placed in a 1 state. Because of the positions of the switches in unit 240 associated with terminal C-9, this 1 state is applied to conductor 248, but not to conductor 250. As a consequence, and as can be seen in FIG. 9, voltage C remains in a 1 state, while voltage D switches to a 0 state. This switching of voltage D indicates that note 52 within span d is supposed to have ended. The continuing of voltage C in a 1 state indicates that a note, specifically note 54, is supposed to begin at the beginning of program span e.

From this description, it is believed to be evident how, as the next several successive clock pulses are received, the balances of voltages C, D as shown in FIG. 9 are generated.

Voltages $\overline{B(II)}$, D are combined in a well known manner in AND gate 242 to produce voltage E which is applied to conductors 186, 252. Voltage E is inverted by inverter 246, and then applied to AND gate 244 along with voltage C. Gate 244 combines these two voltages in a well-known manner to produce voltage F shown in FIG. 9. The positive portions of voltage F represent the minimum acceptable note-performance times herein—the preferred beginnings of notes coinciding with the positive edges of these portions. Thus, it will be observed that voltage F contains positive portions at the beginnings of program spans d and e to indicate preferred beginning times, and minimum acceptable performance times, for notes 52, 54. It will be observed further that no such positive portion exists in span f which contains rest 56. This is because it is intended during this span that the student not close switch 22a.

The positive portions of voltage E generally indicate that the different notes and the rest in the program should end by certain times. Thus, such portions exist at the ends of spans d, e, f to indicate that the notes 52, 54 and rest 56 should end.

As mentioned previously, voltages E and F are supplied to decision circuits 146, 148, wherein, along with other voltages still to be described, they are used to judge the student's performance of the exercise.

Considering the operation of turn-on decision circuit 146, this will be discussed particularly in connection with FIGS. 10 and 11. The primary purpose of the turn-on decision circuit is to judge the time-beginning of the student's performance of each note in the exercise, and, if his performance is judged to be correct, to cause the light-emitting diode behind the particular note to light up. In general terms, a student's performance-beginning of a note will be judged correct if it falls within the time span of the WINDOW(II) pulse associated with the note. If the student begins a note before or after this time span, his performance is incorrect.

Turning specifically to FIG. 11, various voltages shown here in spans d, e and f have already been discussed, respecting their origins. These include voltages CLOCK, WINDOW(II), $\overline{STUDENT}$, F and E. Marked over the various WINDOW(II) pulses are C numbers showing with which of the program positions the different WINDOW(II) pulses are related. Considering for a moment voltage $\overline{STUDENT}$, the durations of the positive voltage portions of this voltage reflect the respective time periods that the student leaves switch 22a closed. The 0 portions of the voltage result with switch 22a open. The left-hand positive pulse shows the student's performance of note 52, the intermediate pulse, his performance of note 54, and the right-hand pulse, his faulty playing during rest 56.

Considering the left-hand pulse in voltage $\overline{STUDENT}$, it will be observed that the beginning of this pulse is before the WINDOW(II) pulse (directly underlying the negative edge of CLOCK pulse C-8) which is associated with the beginning of note 52. The student's beginning of note 52 is thus premature, and incorrect. The beginning, or positive edge, of this pulse generates the first positive voltage spike in voltage H which is applied to the upper input of gate 254. This spike, however, occurs while WINDOW(II) is still 0, and thus the output of gate 254 remains in a 1 state, and latch circuit 260 remains in a reset condition.

On the arrival of WINDOW(II) pulse C-8, the positive edge of this pulse generates the first negative voltage spike shown in voltage G which is applied to the reset terminal of latch circuit 260. This spike, of course, has no effect at this time since the latch circuit is already reset.

As a consequence of such actions, the output terminal of latch circuit 260 remains in a 0 state, and the output of gate 264 is held also in a 0 state. The arrival of the first pulse in voltage F does not change the condition on the output of gate 264. Nor does it change the already reset condition of latch circuit 262.

Nothing further of consequence occurs in circuit 146 until the arrival of the negative edge of the first E pulse. Thus, during program span d, no positive spike or pulse is produced in voltage K which is generated at the output of gate 266. As will become apparent, such a spike or pulse is necessary if the light-emitting diode 110 which is associated with note 52 is to be turned on. This light-emitting diode, of course, remains off. Further, all during the time period which has so far been described in connection with the operation of circuit 146, voltage J, which is generated at the output terminal of latch circuit 262, remains 0.

With the arrival of the negative edge of the first E pulse, this generates the first negative spike shown in voltage I which is applied to the set terminal of latch circuit 262. But for the fact that the positive edge of the second F pulse is coincident with this spike, latch circuit 262 would be set. However, because of such coincidence, the latch circuit remains reset, and voltage J remains 0.

Since the student failed to begin note 52 correctly, and since the associated light-emitting diode 110 is not turned on, the performance of this note is considered bad in toto, and no effort is made to provide an independent judgment of the performance-ending of the note.

Considering the student's performance beginning of note 54, here it will be seen that he begins this performance within associated WINDOW(II) pulse C-9, and that the second positive H spike occurs during this pulse. As a consequence, latch circuit 260 is set, whereupon it applies a 1 to the upper input of gate 264. Since voltage F is at this time 1, the output of gate 264 switches to a 1 state, which then causes the output of gate 266 also to switch to a 1 state. Voltage K thus changes from 0 to 1, and signals the four light-emitting diodes 110 which are associated with note 54 to turn on—thus indicating a good performance-beginning for note 54.

The student's performance-ending of note 54 will be discussed later.

With the arrival of the positive edge of WINDOW(II) pulse C-10, the resulting negative G spike resets latch circuit 260, returning the outputs of gates 264, 266, and voltage K, to 0. Latch circuit 260 is thus prepared to judge the next-to-be-performed note. As will become apparent, the duration of a positive K pulse or spike is not important.

Nothing more of consequence occurs until the arrival of the negative edge of the second E pulse. And, it will be noted that throughout the duration of program span *e*, voltage J still remains 0. The arrival of this negative edge generates the second negative spike in voltage I which, since there is no coincident F pulse, sets latch circuit 262. Voltage J thus switches from 0 to 1, and a positive spike is then applied through filter 268 and capacitor 288 to the lower input of gate 266. Consequently, a positive spike appears in voltage K which effects turning-on of the two light-emitting diodes 110 associated with rest 56.

The third pulse shown in voltage $\overline{\text{STUDENT}}$ will be discussed in connection with the operation of turn-off decision circuit 148. The H spike generated by this third pulse has no effect of particular interest in the operation of circuit 146.

The next event of interest in circuit 146 is the arrival of the negative edge of the third E pulse. This generates the third negative I spike which, it will be observed, is coincident with the beginning of another positive F pulse. This next pulse signals the beginning of note 58 in program span *g*. Consequently, latch circuit 262 is reset, with voltage J switching from 1 to 0.

From a review of the operation of circuit 146 as just described, it will be noted that voltage J remains 0 during program spans containing notes, and is 1 during a span containing a rest. Such behavior has significance in the operation of turn-off decision circuit 148. The performance described in circuit 146 is fully representative of what takes place throughout any program selected by a student for practice.

Turning to the L.E.D. driver circuit illustrated in FIG. 14, let us consider how the operations just discussed in circuit 146 affect the driver circuit. It will be recalled that the student's performance beginning of note 52 was incorrect. As a result, and as already mentioned, the light-emitting diode 110 associated with note 52 does not light up. The reason for this is that during program span *d*, no positive pulse or spike occurs in voltage K. Had such a spike or pulse occurred, and with output terminals C-8 in the shift register being then in a 1 state, latch circuit 357 in subcircuit 340 would have been set. Such action would have applied a 1 state to the latch circuit's output terminal, which would have caused the connected light-emitting diode 110 to turn on. In the absence of such a spike or pulse, however, the diode remains off.

The student's performance beginning of note 54, in program span *e*, was correct. The result, it will be recalled, was that voltage K (which is applied to conductor 194) switches to a 1 state. With output terminals C-9 in the shift register then in a 1 state, the latch circuit in subcircuit 342 is set, and turns on the connected light-emitting diode. Further, because of the switch interconnections between subcircuits 342, 344 and the other two subcircuits associated with program span *e*, the other three latch circuits associated with program span *e* are also set, and turn on their respective connected light-emitting diodes 110.

Similar operation takes place throughout the entire performance of an exercise. In other words, each time that a student correctly begins a note in the exercise, a signal is generated which causes all of the one or more light-emitting diodes 110 associated with this note to be turned on. If a student does not correctly begin a note, such a signal does not occur. In the case of a rest existing in the program, the light-emitting diode or diodes associated therewith are automatically turned on at the beginning of the rest.

The significance of the fact that where multiple light-emitting diodes are associated with a note, or rest, all of them turn on simultaneously, is that this enables a program card designer physically to locate the representation of a note or rest at any desired point within the corresponding program span on the card. As a consequence, under most circumstances it is possible to produce program cards which conform well to the usual physical layout of notes and rests formed in ordinary sheet music.

Let us consider now the operation of turn-off decision circuit 148. This will be discussed particularly in connection with FIGS. 12 and 13. In general terms, the purpose of this circuit is to determine whether a student ends a note within a certain selected time span, and if he does so, to allow the corresponding light-emitting diodes 110 to remain lit, assuming that they were lit previously as an indication of a correct performance beginning of the note. If a student fails to end a note within this period, or inadvertently plays during a rest, the corresponding light-emitting diodes are turned off.

Speaking more specifically, what might be thought of as an allowable finish period for a note is that time period beyond the end of the F pulse associated with the note and up to the beginning of the WINDOW pulse associated with the next note. Four conditions are judged as producing improper endings for notes and rests in an exercise. First is a premature finish of a note, where the student opens switch 22a before the end of the F pulse associated with the note. Second is a late finish where the student holds switch 22a closed beyond the beginning of the WINDOW pulse associated with the next successive note or rest in the exercise. The third situation occurs where the student opens switch 22a within the allowable finish period for a note, but then, also within the same allowable finish period, closes the key again, prematurely beginning the next note in the exercise. Finally judged improper is any note played during a rest period.

Turning now to FIGS. 12 and 13, included in FIG. 13 for program spans *d*, *e*, *f* are graphs showing previously discussed voltages CLOCK, F, WINDOW(II), E, $\overline{\text{STUDENT}}$, and J. Voltages L, M, N, O, P, Q, R are all generated within the circuit—voltage Q being the one which is supplied the L.E.D. driver circuit to effect turning off of lamps in the event of an improperly performed note or rest.

In the case of a premature finish, this situation is judged by gates 308, 316 in circuit 148. In gate 308, the WINDOW(II) and E pulses are combined to produce voltage R as shown in FIG. 13. The negative-going edges, of voltage E generate the negative spikes in voltage M on conductor 332. These spikes operate to set latch circuit 300. Voltage L, which is generated from voltage F, operates to reset latch circuit 300, on whose output terminal voltage N thus appears which is applied to the lower input of gate 316. The upper input of gate 316 receives the inverse of voltage O which is generated from the negative edges of the pulses in voltage STUDENT.

In the event that the student ends a particular note prior to the ending of the corresponding F pulse, gate 316 applies a 1 state to the lower input of gate 306, resulting in a 1 state being applied to conductor 192. Such a situation occurs with the student's ending of his performance of note 54, where, it will be noted he has terminated his performance prior to the end of the corresponding F pulse. The result is, and referring to voltage Q which occurs on conductor 192, that a positive voltage spike occurs in this voltage at this time. Such a spike results from the occurrence of the second O spike while voltage N is still 1. As will be explained shortly, this spike on conductor 192 results in turning off of the four light-emitting diodes 110 which are associated with note 54, and which were turned on at the beginning of the note.

The case of a late finish is judged essentially by gate 314. The upper input of this gate receives the inverse of voltage R, and the lower input of the gate receives signals from the output of latch circuit 302. Latch circuit 302 is set by the negative spikes in voltage M, and is reset by any negative spike produced in voltage P which is generated from voltages O and N as combined in OR gate 304. In the event that a student finishes beyond the allowable finish period described earlier, the output of gate 314 supplies a 1 state to the connected input of gate 306, resulting in a positive voltage excursion on conductor 192. This positive excursion results from the fact that latch circuit 302 will be in a set condition (applying a 1 state to the lower input of gate 314) while at least a portion of a negative R pulse occurs. Although there is no specific illustration herein of a true late finish, the action which occurs in circuit 148 in such a situation is similar to that which occurs at the end of span *e* as a result of the student having finished note 54 prematurely, and having not played again during span *e*. Thus, at the end of span *e*, latch circuit 302 is set during the occurrence of the second negative R pulse. Consequently, there occurs in voltage Q a positive pulse, simultaneous in time with this R pulse. This positive pulse, is, however, ineffective inasmuch as it is redundant with respect to the positive Q spike just discussed above.

Gate 310 takes care of the situation where a student completes a note within an allowable finish period, but then, within the same period, begins a new note. Combined in this gate to make this determination are the inverse of the R voltage, the voltage generated at the output of latch circuit 302, and the inverse of the voltage appearing at the output of inverter 293.

In the event that the student inadvertently starts a new note as just indicated, the output of gate 310 supplies a 1 to the connected input of gate 306, again producing a positive voltage excursion on conductor 192. This situation is not illustrated in FIG. 13.

In the event that a student plays a note during a rest period, such as during the period for rest 56, this situation is judged essentially by gate 312. Combined in gate 312 to make this determination are the R voltage, the STUDENT voltage, and the J voltage.

The situation of such playing occurring is illustrated in FIG. 13 where it will be observed that the student has indeed attempted to play a note during program span *f*. The result of this is that the output of gate 312 supplies the upper input of gate 306 with a 1 state, which again causes a positive excursion on conductor 192.

With a 1 state, even momentarily, occurring in voltage Q on conductor 192, this is supplied to L.E.D. driver circuit 144. In particular, should such a 1 state occur during the period of a given clock pulse, if the latch circuit (such a circuit 357) in driver circuit 144 which is associated with that clock pulse is then in a set condition (with its associated light-emitting diode 110 turned on), the latch circuit will be reset, thus turning off the light-emitting diode. Thus, in the case of note 54 which, it will be recalled, was properly initiated by the student, since the student failed to finish the note properly, all four of the light-emitting diodes associated with this note will be turned off. The same is true also with respect to the light-emitting diodes associated with rest 56, since the student attempted to play a note during the period of this rest. It makes no difference at what point in a program span a student's performance ending of a note, or improper playing during a rest, is judged. If an error has been made, all light-emitting diodes associated with the note or rest will simultaneously be turned off (if they are on). This results from the interconnections mentioned earlier between the subcircuits in circuit 144.

It will thus be apparent that once a student begins performing a selected exercise, both the time-beginnings and time-endings of his various note performances will be judged as to accuracy, as also will be his performance of rests. In the case of a note, if it is begun correctly, the associated light-emitting diode behind the program card will light up to indicate correct initiation. However, they will remain lit only if the note is also finished properly. In the case of a rest, the light-emitting diode or diodes associated therewith will automatically light up when the rest period is supposed to begin; but will remain lit only if no attempt is made during this period to play a note. Thus, an immediate direct confirmation is given a student with respect to both the time-beginnings and endings of his note and rest performances. By looking at the lighted conditions of the various note and rest representations in a program card after completing an exercise, a student can see immediately where he has succeeded and failed. He is thus given an immediate objective picture of those areas of his performance where he must improve.

If he wishes to change the degree of difficulty of performance, he does this simply by operating switch 30 to change the durations of the B and WINDOW pulses. The narrower he makes these pulses, the more difficult it will be for him to perform an exercise accurately.

Had the student, at the beginning of the exercise, placed switch 32*a* in engagement with contact 32*c*, then, while initially the metronome circuit would have produced metronomic beats, these audible beats would have disappeared the instant the student began performing the exercise. They would return, however, immediately at the conclusion of the exercise, through the operation of metronome auto-control circuit 160. The metronome autocontrol circuit responds to state changes both on conductor 178 and on the lower thirty-second output terminal of the shift register. At the beginning of an exercise, circuit 160 applies a 1 state to conductor 210. Gate 150 thus supplies pulses to metronome circuit 152. When the student begins playing, and a 1 state is applied to conductor 178, circuit 160 applies a 0 state to conductor 210. This closes gate 150, and shuts off the metronome circuit. At the end of an exercise, and more particularly with the arrival of the thirty-second CLOCK pulse, the thirty-second output terminals of the shift register switch to a 1 state. Circuit 160 responds to this change by returning a 1 state to conductor 210, which reopens gate 150.

Under such circumstances, it is even more difficult for a student to perform an exercise, since he must himself be capable of keeping the appropriate beat for the exercise.

At the end of an exercise, the student momentarily closes key switch 24a. This returns a 0 to conductors 168, 178, 180, 190, 196, and resets device 15. Such resetting may be done at any time, including during the performing of an exercise.

The various time periods chosen herein for judging the time-beginnings and time-endings of notes have been selected to conform to what many experts agree are acceptable rhythmic patterns for musical playing. These time periods, of course, may be altered if desired.

Further, while device 15 has been disclosed as one which is programmed in accordance with various apertures which exist in a program card, it should be noted that other means may be used, if desired. For example, a multiplicity of manual switches could be used. Also, a card could be configured so that when it is inserted in the device it automatically operates certain mechanical switches in the device.

A greater or lesser number (than 32) of program position could, of course, be used.

It should further be understood that while device 15 has been illustrated with a key switch for responding to a student's performance, other means here also could be used. For example, a microphonic input could be employed to respond to a student's actual playing of an instrument, or his singing of notes, with this microphonic input connected to operate a switching device which would perform like switch 22a.

A modification which, of course may readily be made if desired, is to equip device 15 automatically to play out the program contained on any card used with it. Such an option might be useful, for example, in allowing a student to hear the proper performance of the program. Or, it might also be useful in extending the device's capabilities into the field of so-called rhythmic dictation, where a student is required to write down the note and rest characters of a musical passage which he hears.

Considering another important feature of the invention, with the window pulses generated as described, it will be noted that their durations follow adjustments in the frequency (and hence pulse width) of pulses produced by oscillator 126. This permits infinitely adjustable proper time-proportioning of the window pulses with selected changes of tempo. For example, at relatively slow tempos, experience has shown that, on an absolute time basis, longer WINDOW pulses are required to judge accurate performance, whereas at fast tempos, shorter WINDOW pulses are acceptable. This relates to the observable situation that it is normally more difficult for a person to perform with absolute precision at slow tempos than at fast tempos.

Further, the time-proportioning mentioned assures that under no circumstance will WINDOW pulses be long enough to overlap, which event would destroy the apparatus's ability fairly to judge a student's performance.

The invention thus provides a device amply fulfilling the various objectives stated for it earlier. And, while a preferred embodiment of the invention has been described, and certain modifications suggested, it is appreciated that various modifications and changes may be made without departing from the spirit of the invention.

It is claimed and desired to secure by Letters Patent:

1. In a rhythm teaching system employing masking means for displaying a musical rhythmic sequence to be performed and for storing information concerning the correct performance of said sequence, said masking means having musical elements of said sequence displayed thereon, display light-transmissive regions therein associated with said elements, and having storage means for storing programming information on said masking means, said information corresponding to correct performance of the beginnings and endings of said musical elements, a rhythm teaching machine comprising performance input means for receiving a student's performance of said sequence, means for holding and positioning said masking means in said machine, display light means including a plurality of lights, one associated with and viewable through each of said display light-transmissive regions in said masking means when the same is positioned in said machine, sensing means for reading the programming information stored on said masking means, program storage means responsive to said sensing means for storing said programming information in said machine, means operatively coupled to said storage means and responsive to the program information stored therein for generating time sequenced information corresponding to a correct performance of said musical sequence, judging means responsive both to said performance input means and to said generating means for comparing the student's performance of musical elements in said sequence with said time sequenced information to determine the correctness of the student's performance, and means responsive to said judging means for actuating said lights to indicate, by one appearance state, a correct performance of an element, and by another appearance state, an incorrect performance of that element.

2. The teaching machine of claim 1, further comprising metronome means selectively operable in one mode for producing an audible tempo signal before, during and after a student's performance, and in another mode for producing such a signal only before and after a student's performance.

3. The teaching machine of claim 1, wherein said generating means comprises electronic circuitry including a variable-frequency source of electrical pulses, and window pulse generating means responsive to said source for generating time-spaced window pulses for use in judging the rhythmic accuracy of a student's performance, said window pulses having a time width directly proportional to the frequency of said source.

4. The teaching machine of claim 1, wherein said generating means includes means for varying said time-sequenced information to change the degree of rhythmic accuracy necessary in a student's performance of said musical elements to be judged correct by said judging means.

5. The teaching machine of claim 1, wherein said judging means and light actuating means together comprise means for lighting the one of said plurality of lights associated with a musical element only if the performance-beginning of a student's performance of said element is judged to be accurate by said judging means, and for maintaining said light in a lighted condition only if the student's performance-ending of said element is thereafter judged to be accurate.

6. A rhythm teaching system comprising, in combination, a mask for displaying a musical rhythmic sequence to be performed and for storing information concerning the correct performance of said sequence, said mask comprising a card having musical elements of said sequence displayed thereon, display light-transmissive regions therein associated with said elements, and having storage means for storing programming information on said card, said information corresponding to correct performance of the beginnings and endings of said musical elements, and rhythm teaching apparatus comprising performance input means for receiving a student's performance of said sequence, display light means including a plurality of light sources, means accommodating removable placement of said card in a masking position adjacent said sources whereby different ones of said sources are positionally associated with and viewable through different light-transmissive regions in said card, sensing means for reading the programming information stored on said card, program storage means responsive to said sensing means for storing said programming information in said apparatus, means operatively coupled to said storage means and responsive to the program information stored therein for generating time-sequenced information corresponding to a correct performance of said musical sequence, judging means responsive both to said performance input means and to said generating means for comparing the student's performance of musical elements in said sequence with said time-sequenced information to determine the correctness of the student's performance, and means responsive to said judging means for actuating said light sources to indicate, by one appearance state, a correct performance of an element, and by another appearance state, an incorrect performance of that element.

7. The combination of claim 6, wherein said storage means for storing programming information comprises light-transmissive zones in said card, and said sensing means comprises electro-optical circuit means.

8. The combination of claim 7, wherein said programming information is stored in multiple rows of said light-transmissive zones, with the zones in one row corresponding to correct beginnings of said musical elements, and the zones in another row corresponding to correct endings of said elements.

9. The combination of claim 6, wherein said display light transmissive regions are disposed in a row in said card, spaced apart to depict the desired rhythmic pattern of the sequence to be performed.

10. The combination of claim 9, wherein said display light-transmissive regions are shaped to represent notes and rests comprising said musical rhythmic sequence.

11. The combination of claim 6, further comprising metronome means selectively operable in one mode for producing an audible tempo signal before, during and after a student's performance, and in another mode for producing such a signal only before and after a student's performance.

12. The combination of claim 6, wherein said generating means comprises electronic circuitry including a variable-frequency source of electrical pulses, and window pulse generating means responsive to said source for generating from such pulses time-spaced window pulses for use in judging the rhythmic accuracy of a student's performance, said window pulses having a time width directly proportional to the frequency of said source.

13. The combination of claim 12, wherein said apparatus further includes student-selectable tempo control means for varying the frequency of said variable-frequency source.

14. The combination of claim 6, wherein said generating means includes means for varying said time-sequenced information to change the degree of rhythmic accuracy necessary in a student's performance of said musical elements to be judged correct by said judging means.

15. The combination of claim 6, wherein said one appearance state is a lighted state, said other appearance state is an unlighted state, and said judging means and light actuating means together comprise means for lighting the one of said plurality of lights associated with a musical element only if the performance-beginning of a student's performance of said element is judged to be accurate by said judging means, and for maintaining said light in a lighted condition only if the student's performance-ending of said elements is thereafter judged to be accurate.

16. The combination of claim 6, wherein said apparatus further includes audio tone generating means responsive to said performance input means for generating an audible tone for monitoring of the performance input by the student.

* * * * *